(12) United States Patent
Juban et al.

(10) Patent No.: US 11,263,703 B2
(45) Date of Patent: Mar. 1, 2022

(54) SYSTEMS AND METHODS FOR ANTI-MONEY LAUNDERING ANALYSIS

(71) Applicant: C3.ai, Inc., Redwood City, CA (US)

(72) Inventors: Romain Florian Juban, San Francisco, CA (US); Adrian Conrad Rami, San Francisco, CA (US); Anton Rubisov, Palo Alto, CA (US); Thomas M. Siebel, Woodside, CA (US)

(73) Assignee: C3.AI, INC., Redwood City, CA (US)

( * ) Notice: Subject to any disclaimer, the term of this patent is extended or adjusted under 35 U.S.C. 154(b) by 0 days.

(21) Appl. No.: 17/173,150

(22) Filed: Feb. 10, 2021

(65) Prior Publication Data

US 2021/0224922 A1 Jul. 22, 2021

Related U.S. Application Data

(63) Continuation of application No. PCT/US2019/061239, filed on Nov. 13, 2019.

(60) Provisional application No. 62/767,408, filed on Nov. 14, 2018.

(51) Int. Cl.
*G06Q 40/00* (2012.01)
*G06N 20/00* (2019.01)

(52) U.S. Cl.
CPC ............ *G06Q 40/12* (2013.12); *G06N 20/00* (2019.01)

(58) Field of Classification Search
None
See application file for complete search history.

(56) References Cited

U.S. PATENT DOCUMENTS

| 9,923,931 | B1* | 3/2018 | Wagster ................. H04L 63/30 |
| 2011/0145167 | A1 | 6/2011 | Donoho et al. |
| 2011/0173093 | A1 | 7/2011 | Psota et al. |
| 2014/0058914 | A1* | 2/2014 | Song ..................... G06Q 40/06 705/35 |

(Continued)

FOREIGN PATENT DOCUMENTS

WO  WO-2020102395 A1  5/2020

OTHER PUBLICATIONS

PCT/US2019/061239 International Search Report and Written Opinion dated Feb. 10, 2020.

*Primary Examiner* — Paul Danneman
(74) *Attorney, Agent, or Firm* — Wilson Sonsini Goodrich & Rosati

(57) ABSTRACT

The present disclosure provides systems and methods that may advantageously apply machine learning to accurately identify and investigate potential money laundering. In an aspect, the present disclosure provides a computer-implemented method for anti-money laundering (AML) analysis, comprising: (a) obtaining, by the computer, a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; (b) applying, by the computer, a trained algorithm to the dataset to generate a money laundering risk score for each of the plurality of account holders; and (c) identifying, by the computer, a subset of the plurality of account holders for investigation based at least on the money laundering risk scores of the plurality of account holders.

29 Claims, 30 Drawing Sheets

(56) References Cited

U.S. PATENT DOCUMENTS

2017/0270534 A1    9/2017  Zoldi et al.
2019/0220863 A1*  7/2019  Novick ............... H04W 12/122

* cited by examiner

FIG. 8

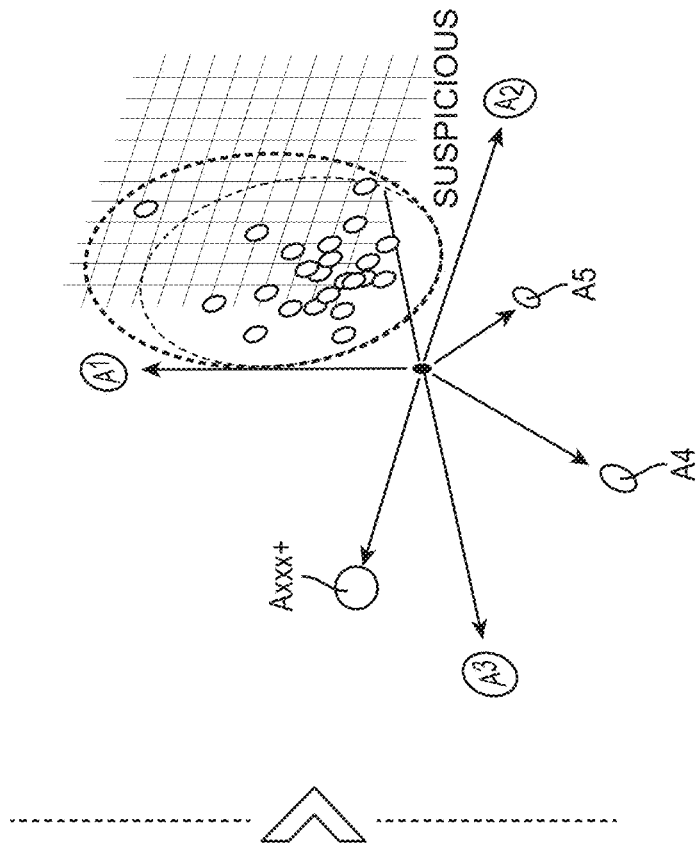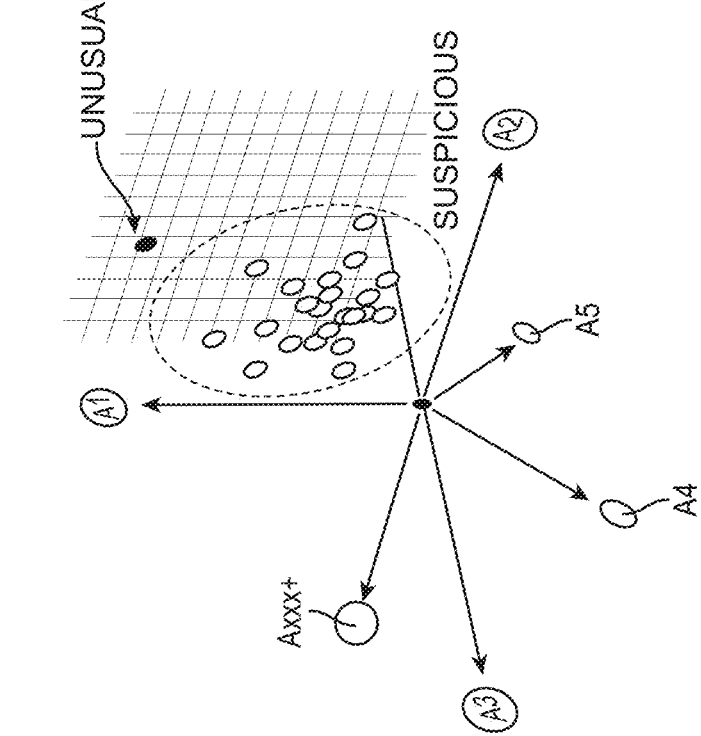
FIG. 14B

| Feature Class | Description | Examples |
|---|---|---|
| Party Attributes | Attributes or characteristics of the client including both internal and externally available data | · Adverse media score for fraudulent activity<br>· Party is domiciled in high-risk country<br>· Party is Private Investment Company<br>· Party is politically exposed person |
| Party Behaviors | Behavior of parties as demonstrated through transactions, wires, or other actions that leave a digital trace | · Ratio of deposits/withdrawals last 360 days<br>· Value of ATM deposits >5K, <10K last 7 days<br>· Activity in dormant account last 2 days<br>· Count of transactions using currency from risky country |
| Anomalies | abnormal transaction patterns relative to stated business; abnormal patterns relative to historical benchmark; abnormal patterns relative to stated income | · Cash-equivalent transactions relative to peers last 7 days<br>· Burst in beneficiary activity last 2 days<br>· High-risk transactions relative to historical last 30 days<br>· High-risk country transactions relative to peers last 180 days |
| Associations | proximity to known money launderers; similar transaction patterns to known money launderers; associations with high-risk businesses or countries | · Shortest graph path to known illicit organization<br>· Sum value of wires where counterparty didn't disclose name<br>· Number of 2nd degree connections with >1 shared nodes<br>· Number of related parties |
| Segmentation | segmentation based on country, transaction behavior, business sector, legal entity type, shared accounts, high-frequency relationships | · Behavior-based AI segmentation<br>· Profile information, KYC based AI segmentation<br>· Network and associations based segmentation<br>· % of segment that is known illicit organization |

FIG. 14E

| Feature Class | Description | Examples |
|---|---|---|
| Suspicious Information | Customer provides suspicious or incomplete information | · Client affiliated with consulate<br>· Client is non-profit organization |
| Recordkeeping Avoidance | Customer behavior is designed to avoid reporting thresholds or requirements | · Redaction to party address info last 180 days<br>· Count of transactions <10K last 7 days |
| Funds Transfers | Customer conducts suspicious transfers | · Cash/total ratio last 30 days<br>· Suspicious payment instruction last 2 days |
| Inconsistent Behavior | Customer behavior relative to expected behavior | · Transaction value/income ratio last 360 days<br>· Wire count relative to peers last 30 days |
| Cross-border Transactions | Customer has ties to or conducts transactions with high-risk geographies | · Number of unique countries last 180 days<br>· Value with high-risk countries last 7 days |
| Shell Company Activity | Customer or account operates on behalf of unknown beneficiary | · Address is P.O. box<br>· Number of parties at same address |
| Other | Other red flags including suspicious lending, insurance or other activity | · Loan scheduled balance net actual balance<br>· Surrendered insurance contract last 30 days |

FIG. 14F

| Feature Class | Description | Examples |
|---|---|---|
| Placement | Introduction of illicit funds into formal financial services | • Count scheduled net count actual loan payment<br>• Client is non-profit organization |
| Layering | Movement of funds to obfuscate trail to funds' origin | • Redaction to party address info last 180 days<br>• Count of transactions <10K last 7 days |
| Integration | Transactions to create appearance of legality for sources of funds | • Client affiliated with cash-intense business<br>• Scheduled/actual loan payment discrepancies |

FIG. 14G

| Feature Class | Description | Examples |
|---|---|---|
| Transaction Monitoring | Suspicious activity or transaction monitoring systems | - Avg. party/counterparty distance last 30 days<br>- Value of transfers to risky country last 2 days |
| Know Your Customer | Know your customer or client due diligence systems | - Associated with terrorist org in social media<br>- Party is citizen of high-risk country |
| Watch List | Watch list filtering for politically exposed or other relevant persons | - Associated with terrorist org in social media<br>- Known politically exposed person |

FIG. 14H

| Potential Typology | Feature | Contribution | Value |
|---|---|---|---|
| High-risk Associations | Count Of Foreign Accounts | 0.332 | 2.0 |
| | Count of Credits Of Related Party Transactions Between 5000 and 10000 in Last 180 Days | 0.249 | 1.0 |
| | Count Of Foreign Personal Investment Co Accounts | 0.248 | 3.0 |
| | Account Holder Has Global Risk Rating 2 | 0.206 | 1.0 |
| Unusual Fund Transfer | Count Of High-Risk Debit Transactions Between 10000 And 100000 In Last 180 Days | 0.192 | 23.0 |
| Cross-Border Transactions | Sum Of Count or All Transactions Message Contains Panama In Last 180 Days | 0.188 | 1.0 |
| | Sum Of All Transactions Originating From Country With Risk Rating 1 In Last 180 Days | -0.147 | 520,405 |
| | Total Balance | 0.142 | 1,204,532 |
| Lack of Transparency | Account Holder Added Industry Code In Last 90 Days | 0.118 | 0.0 |
| Tax Evasion | Sum Of Value Of All Transactions Message Contains Tax In Last 180 Days | -0.108 | 0.0 |
| Unusual Fund Transfer | Change In Avg Count Of Debit Transactions In Last 180 Days Compared To Previous 180 Days | -0.102 | 0.174 |
| | Account Holder Is Operating Company | 0.097 | 0.0 |
| Activity Inconsistency | Sum Of Value Of All Transactions Message Contains Company In Last 180 Days | 0.093 | 405,000 |
| | Sum Of Count Of All Transactions Message Contains Chip In Last 2 Days | 0.084 | 12,500 |
| Unusual Fund Transfer | Count Of Debit Transactions Between 10000 And 100000 In Last 180 Days | -0.062 | 2.0 |
| Unusual Fund Transfer | Stddev Count Of High-Risk Debit Transactions In Last 180 Days | 0.051 | 0.083 |
| Lack of Transparency | Sum Of Value Of All Transactions Message Contains Llc In Last 180 Days | 0.011 | 0.0 |
| Lack of Transparency | Count Of All Transactions With Counterparty In Different Financial Institution In Last 2 Days | -0.004 | 1.0 |

FIG. 14I

Example Potential Typologies
- Lack of Transparency
- Cross-Border Transactions
- Structuring
- Flow Through of Funds
- Unusual Fund Transfer
- High-risk Associations
- Activity Inconsistency
- Tax Evasion

Categories of Feature Contributions
- Account Holder Characteristics and Changes
- Balances
- Structuring Activity
- Flow Through of Funds
- Direct Geographic Risk and Associated Risk
- Natural Language Processing
- Transaction Activity Changes
- Related Party Characteristics

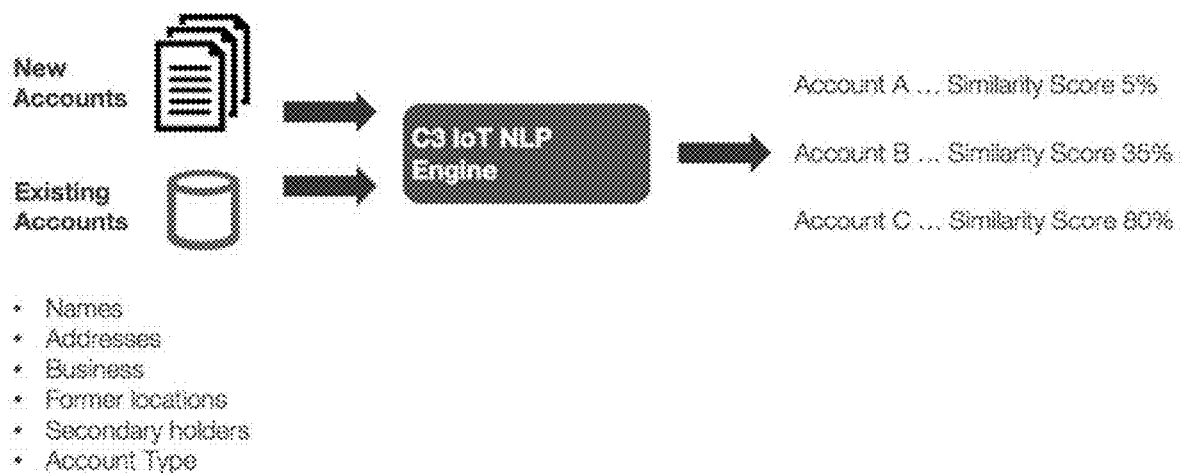
- Names
- Addresses
- Business
- Former locations
- Secondary holders
- Account Type
Natural Language Processing on Transaction Messages
C3 NLP capabilities leveraged on transaction messages to derive important information
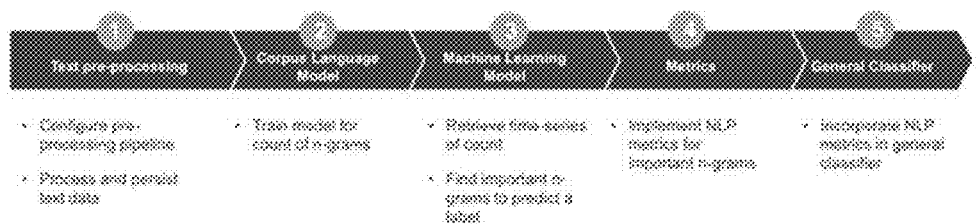
FIG. 15

C3 ANTI MONEY LAUNDERING ANALYTICS

| ANALYTICS CLASS | DESCRIPTION | ANALYTICS |
|---|---|---|
| PLACEMENT | ○ Review large transactions for new or modified accounts<br>○ Flag suspicious account holders or falsified identification | ○ New transaction<br>○ Suspicious account change | ○ Suspicious identification<br>○ Large transaction after account change |
| LAYERING | ○ Identify size and speed of transaction that may indicate layering | ○ Small transactions after large<br>○ Consistent transactions in time | |
| FOREIGN EXCHANGE | ○ Identify currency exchange with suspicious entities associated with high crime of terrorist activities<br>○ Correlate transactions with moves in forex markets<br>○ Identify suspicious transactions using SWIFT | ○ Known terrorist connections<br>○ Transactions without forex discrimination | ○ Inconsistent currency exchange |
| STRUCTURING | ○ Identify structuring of transactions at multiple locations to avoid federal reporting limits<br>○ Identify number of transactions below limits required to show identification | ○ Number of unique transaction locations<br>○ Transactions below reporting limits<br>○ Transactions below ID limits | ○ No account changes<br>○ Unique tellers<br>○ Transactions of similar size |
| SUSPICIOUS ACTORS | ○ Identify transactions with suspicious entities (terrorist regimes, criminal connections)<br>○ Correlate depositors with criminal backgrounds<br>○ Identify transactions inconsistent with stated occupations | ○ Terrorist backed entities<br>○ Criminal connection<br>○ High transactions | ○ Transactions inconsistent with occupation<br>○ Degree of closeness with terrorist activity |
| TRANSACTION | ○ Review cash rations by transaction and aggregate<br>○ Identify multiple deposits of similar size<br>○ Track transactions spatially and temporally<br>○ Flag various but consistent usage of non-conventional monetary instruments<br>○ Align transaction speed with account changes<br>○ Track transactions within retail, correspondent banking, securities and insurance across business<br>○ Identify unusual withdrawals<br>○ Align speed of withdrawals relative to deposits | ○ Cash ratio<br>○ Deposit variance<br>○ Graph of transactions in space and time<br>○ Opt-out customer<br>○ Cash ratio aligned with account change<br>○ Unique monetary instruments<br>○ Unusual withdrawal size | ○ Unique transaction locations<br>○ Currency exchange<br>○ Retail transactions<br>○ Time between transactions<br>○ Transaction above threshold<br>○ Unique account members |
| ACCOUNT | ○ Identify suspicious accounts with many account holders at same address<br>○ Identify connections with blacklisted of suspicious foreign entities<br>○ Identify gaps or missing account data relative to population<br>○ Reference account data with third party database like criminal or business organizations<br>○ Verify account information with government AML sources like (MoLIN)<br>○ Identify unusual use of business account<br>○ Correlate types of businesses at risk for money laundering | ○ Number account holders at address<br>○ Blacklist<br>○ Unusual business<br>○ Criminal ties<br>○ Gaps in account data | ○ Missing account information<br>○ Removed account information<br>○ International account connections<br>○ Suspicious foreign entity connection |

FIG. 18

SYSTEMS AND METHODS FOR ANTI-MONEY LAUNDERING ANALYSIS

CROSS-REFERENCE

This application is a continuation of International Application No. PCT/US2019/061239, filed on Nov. 13, 2019, which claims the benefit of U.S. Provisional Patent Application No. 62/767,408, filed on Nov. 14, 2018, each of which is incorporated by reference herein in its entirety.

BACKGROUND

Anti-money laundering (AML) analysis of financial transactions of accounts and account holders may use algorithms to identify suspicious accounts or parties that may be engaging in illegal or fraudulent activities such as money laundering. AML analysis can generate risk scores to identify suspicious accounts or parties for further investigation.

SUMMARY

The present disclosure provides systems and methods that may advantageously apply machine learning to accurately manage and predict accounts and account holders with money laundering risk. Such systems and methods may allow accurate predictions of money laundering risk based on analysis of account variables based on aggregated data from multiple disparate data source systems, identification of suspicious accounts or account holders for investigation, and identification of actionable recommendations to users, all in real time, near real-time, just-in-time, at regular intervals (e.g., every week, every day, every four hours, etc.), upon the request of a user, or the like.

In an aspect, the present disclosure provides a computer-implemented method for anti-money laundering (AML) analysis, comprising: (a) obtaining, by a computer, a dataset comprising a plurality of accounts, each of the plurality of accounts corresponding to an account holder among a plurality of account holders, wherein each account of the plurality of accounts is defined by a plurality of account variables, wherein the plurality of account variables comprises financial transactions; (b) applying, by the computer, a trained algorithm to the dataset to generate a money laundering risk score for each of the plurality of account holders and one or more key risk drivers associated with the money laundering risk score; and (c) outputting, by the computer, at least a subset of the plurality of account holders based at least on the money laundering risk scores of the plurality of account holders.

In some embodiments, obtaining the dataset comprises obtaining and aggregating datasets from a plurality of disparate sources. In some embodiments, the datasets comprise internal datasets and external datasets. In some embodiments, the plurality of disparate sources comprises one or more of the following: online and retail transactions, account and account holder characteristics, trading surveillance platforms, PEP lists, sanction and regulatory catalogs, terror and criminal watch lists, currency exchange history, or cross-border transaction information. In some embodiments, the method further comprises generating at least a portion of the plurality of account variables based on the aggregated datasets.

In some embodiments, the trained algorithm comprises a machine learning algorithm. In some embodiments, the machine learning algorithm comprises one or more of the following: a support vector machine (SVM), a naïve Bayes classification, a linear regression, a quantile regression, a logistic regression, a random forest, a neural network, a gradient-boosted classifier or regressor, or another supervised or unsupervised machine learning algorithm. In some embodiments, generating the money laundering risk score for a given account holder comprises processing the plurality of account variables of the accounts corresponding to the given account holder using the trained algorithm.

In some embodiments, the method further comprises storing, by the computer, the plurality of money laundering risk scores in a database. In some embodiments, the method further comprises sorting the plurality of account holders based at least on the money laundering risk scores for each of the plurality of account holders. In some embodiments, obtaining at least a subset of the dataset is performed through a cloud-based network.

In some embodiments, the method further comprises identifying the subset of the plurality of account holders for investigation when the money laundering risk score of a given account holder satisfies a predetermined criterion. In some embodiments, each of the plurality of money laundering risk scores is indicative of a probability that the account holder corresponding to the money laundering risk score has one or more accounts comprising one or more account variables comprising one or more financial transactions corresponding to money laundering activity. In some cases, the risk score may be such a probability that an account is being used for money laundering. In some embodiments, the predetermined criterion is a money laundering risk score that is at least about 20%, at least about 30%, at least about 40%, at least about 50%, at least about 60%, at least about 70%, at least about 80%, at least about 90%, at least about 95%, or at least about 99%. In some embodiments, the method further comprises generating a weighted priority score for each of the plurality of account holders based at least on the money laundering risk score of the account holder and a quantitative measure of the account holder or of a transaction of the account holder. In some embodiments, the quantitative measure comprises one or more of the following: a quantity of at-risk assets, a quantity of total assets, a net worth, a number or a total value of suspicious transactions, a length of time of a suspicious transaction or activity, a quantitative measure related to the account holder's relationship to a set of accounts (e.g., a length of time, a number of transactions), a quantitative measure related to the account holder's relationship to one or more other account holders, a quantitative measure related to the relationship between one or more features (e.g., account attributes, transactions) of the account holder and one or more features of another account holder, etc.). In some embodiments, the method further comprises sorting the plurality of account holders based at least on the weighted priority scores for each of the plurality of account holders. In some embodiments, the method further comprises storing, by the computer, the plurality of weighted priority scores in a database. In some embodiments, the method further comprises identifying the subset of the plurality of account holders for investigation when the weighted priority score of a given account holder satisfies a predetermined criterion. In some embodiments, the predetermined criterion is a weighted priority score being a dollar amount of at least about 10 thousand dollars, at least about 25 thousand dollars, at least about 50 thousand dollars, at least about 75 thousand dollars, at least about 100 thousand dollars, at least about 250 thousand dollars, at least about 500 thousand dollars, at least about 750 thousand dollars, or at least about 1 million dollars. In some embodiments, the predetermined criterion is a weighted priority score being a number of suspicious transactions of at least about 1, 2, 3, 4, 5, 6, 7, 8, 9, 10, 15, 20, or more than 20. In some embodiments, the predetermined criterion is a weighted priority score being a length of time of at least about 1, 2, 3, 4, 5, 6, or 7 days, about 1, 2, 3, 4, 5, 6, 7, 8, 9, 10, 11, or 12 months, or about 1, 2, 3, 4, 5, or more years.

In some embodiments, the trained algorithm comprises a natural language processing algorithm configured determine a similarity score between two or more accounts of the plurality of accounts based at least in part on text-based information associated with the two or more accounts. The natural language processing algorithm can be an n-gram model.

In some embodiments, the plurality of account variables comprises one or more of a cash ratio, a layering risk, a structuring risk, a credit risk, a total balance, an address change, a transaction frequency, and a transaction spacing.

In some embodiments, each of the plurality of money laundering risk scores is a probability that a corresponding account is being used for money laundering.

In some embodiments, the trained algorithm comprises layering analytics configured to detect transactions indicative of layering.

In some embodiments, the trained algorithm comprises foreign exchange analytics configured to identify one or more of (i) transactions associated with known terrorist organizations, (ii) transactions without FOREX discrimination, (iii) SWIFT-identified suspicious transactions, and (iv) inconsistent currency exchange transactions. In some embodiments, the trained algorithm comprises suspicious actors analytics configured to target and flag transactions with recipients or senders that have known connections to sanctioned entities or criminal or terrorist databases. In some embodiments, the trained algorithm comprises transaction analytics configured to identify cash ratios, identify multiple deposits of similar size, or flag usage of non-conventional monetary instruments. In some embodiments, the trained algorithm comprises account analytics configured to analyze connections of accounts and account holders to correlate criminal or suspicious activity based on historical cases. In some embodiments, the trained algorithm comprises structuring analytics configured to identify structured transactions. In some embodiments, the trained algorithm comprises graph technology configured to analyze connections between accounts.

In some embodiments, (c) comprises presenting the subset of the plurality of account holders in the graphical user interface in descending order of money laundering risk scores. In some embodiments, the subset of the plurality of account holders comprises account holders flagged for investigation for money laundering.

In another aspect, the present disclosure provides a system for detecting fraudulent activity, comprising: a user interface; one or more computer processors; and memory comprising machine-executable instructions that, upon execution by the or more computer processors, cause the one or more computer processors to perform operations comprising: (a) obtaining account and transaction data associated with a plurality of accounts; (b) applying a trained algorithm to the account and transaction data to generate a money laundering risk score for each of the plurality of accounts; and (c) presenting at least a subset of the plurality of accounts in the user interface based at least on the money laundering risk scores of the plurality of accounts.

In some embodiments, the machine learning model may provide interpretability for an analysis result. The machine learning model may provide interpretability for surveillance and investigation analysts. In some cases, one or more contributing factors associated with a likelihood score may be identified and the respective contribution factor may be generated by the machine learning model. In some cases, the output result of the machine learning model may include a feature contribution factor and a feature importance value for each likelihood score. In some cases, the output result of the machine learning model may include a plurality of features grouped by typologies.

In some embodiments, the method further comprises generating, by the computer, one or more recommended decisions based on the identified subset of the plurality of account holders. In some embodiments, the method further comprises generating an alert when a money laundering risk score for one or more account holders among a plurality of watch list account holders satisfies a predetermined criterion. In some embodiments, the method further comprises generating an alert when a weighted priority score for one or more of a set of watch list account holders satisfies a predetermined criterion. In some embodiments, the plurality of money laundering risk scores is generated in real time, near real-time, just-in-time, at regular intervals (e.g., every week, every day, every four hours, etc.), upon the request of a user, or the like. In some embodiments, the method further comprises processing the identified subset of the plurality of account holders to generate an analytics chart, wherein the analytics chart comprises a visualization and analytic information of each of the identified subset of the plurality of account holders; and displaying the analytics chart to a user. In some embodiments, the visualization comprises a geospatial visualization. In some embodiments, the analytics chart is generated and displayed to the user in real time, near real-time, just-in-time, at regular intervals (e.g., every week, every day, every four hours, etc.), upon the request of a user, or the like.

Another aspect of the present disclosure provides a computer system comprising a digital processing device comprising at least one processor, an operating system configured to perform executable instructions, a memory, and a computer program including instructions executable by the digital processing device to create an application for anti-money laundering (AML) analysis, the application comprising: a first module programmed to obtain a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; a scoring module programmed to apply a trained algorithm to the dataset to generate a money laundering risk score for each of the plurality of account holders; an interpretability module to present the key risk drivers of each money laundering risk score; and an identification module programmed to identify a subset of the plurality of account holders for investigation based at least on the money laundering risk scores of the plurality of account holders.

In some embodiments, the application further comprises an aggregation module programmed to obtain and aggregate datasets from a plurality of disparate sources. In some embodiments, the datasets comprise internal datasets and external datasets. In some embodiments, the plurality of disparate sources comprises one or more of the following: online and retail transactions, account and account holder characteristics, trading surveillance platforms, PEP lists, sanction and regulatory catalogs, terror and criminal watch lists, currency exchange history, or cross-border transaction information. In some embodiments, the aggregation module is programmed to further generate at least a portion of the plurality of account variables based on the aggregated datasets.

In some embodiments, the trained algorithm comprises a machine learning algorithm. In some embodiments, the machine learning algorithm comprises one or more of the following: a support vector machine (SVM), a naïve Bayes classification, a linear regression, a quantile regression, a logistic regression, a random forest, a neural network, a gradient-boosted classifier or regressor, or another supervised or unsupervised machine learning algorithm. In some embodiments, the scoring module is programmed to generate the money laundering risk score for a given account holder by processing the plurality of account variables of the accounts corresponding to the given account holder using the trained algorithm In some embodiments, the application further comprises a storage module programmed to store, by the computer, the plurality of money laundering risk scores in a database. In some embodiments, the application further comprises a sorting module programmed to sort the plurality of account holders based at least on the money laundering risk scores for each of the plurality of account holders. In some embodiments, the first module is programmed to obtain at least a subset of the dataset through a cloud-based network.

In some embodiments, the identification module is programmed to identify the subset of the plurality of account holders for investigation when the money laundering risk score of a given account holder satisfies a predetermined criterion. In some embodiments, each of the plurality of money laundering risk scores is indicative of a probability that the account holder corresponding to the money laundering risk score has one or more accounts comprising one or more account variables comprising one or more financial transactions corresponding to money laundering activity. In some embodiments, the predetermined criterion is a money laundering risk score being at least about 20%, at least about 30%, at least about 40%, at least about 50%, at least about 60%, at least about 70%, at least about 80%, at least about 90%, at least about 95%, or at least about 99%. In some embodiments, the scoring module is programmed to further generate a weighted priority score for each of the plurality of account holders based at least on the money laundering risk score of the account holder and a quantitative measure of the account holder or of a transaction of the account holder. In some embodiments, the quantitative measure comprises one or more of the following: a quantity of at-risk assets, a quantity of total assets, a net worth, a number or a total value of suspicious transactions, a length of time of a suspicious transaction or activity, a quantitative measure related to the account holder's relationship to a set of accounts (e.g., a length of time, a number of transactions, etc.), a quantitative measure related to the account holder's relationship to other account holders or a quantitative measure related to the account holder's relationship to other account holders' data. In some embodiments, the application further comprises a sorting module programmed to sort the plurality of account holders based at least on the weighted priority scores for each of the plurality of account holders. In some embodiments, the application further comprises a storage module programmed to store, by the computer, the plurality of weighted priority scores in a database. In some embodiments, the identification module is programmed to identify the subset of the plurality of account holders for investigation when the weighted priority score of a given account holders satisfies a predetermined criterion. In some embodiments, the predetermined criterion is a weighted priority score being a dollar amount of at least about 10 thousand dollars, at least about 25 thousand dollars, at least about 50 thousand dollars, at least about 75 thousand dollars, at least about 100 thousand dollars, at least about 250 thousand dollars, at least about 500 thousand dollars, at least about 750 thousand dollars, or at least about 1 million dollars. In some embodiments, the predetermined criterion is a weighted priority score being a number of suspicious transactions of at least about 1, 2, 3, 4, 5, 6, 7, 8, 9, 10, 15, 20, or more than 20. In some embodiments, the predetermined criterion is a weighted priority score being a length of time of at least about 1, 2, 3, 4, 5, 6, or 7 days, about 1, 2, 3, 4, 5, 6, 7, 8, 9, 10, 11, or 12 months, or about 1, 2, 3, 4, 5, or more years.

In some embodiments, the machine learning model may provide interpretability for an analysis result. The machine learning model may provide interpretability for surveillance and investigation analysts. In some cases, one or more contributing factors associated with a likelihood score may be identified and the respective contribution factor may be generated by the machine learning model. In some cases, the output result of the machine learning model may include a feature contribution factor and a feature importance value for each likelihood score. In some cases, the output result of the machine learning model may include a plurality of features grouped by typologies.

In some embodiments, the application further comprises a recommendation module programmed to generate, by the computer, one or more recommended decisions based on the identified subset of the plurality of account holders. In some embodiments, the application further comprises an alert module programmed to generate an alert when a money laundering risk score for one or more account holders among a plurality of watch list account holders satisfies a predetermined criterion. In some embodiments, the application further comprises an alert module programmed to generate an alert when a weighted priority score for one or more of a set of watch list account holders satisfies a predetermined criterion. In some embodiments, the scoring module is programmed to generate the plurality of money laundering risk scores in real time, near real-time, just-in-time, at regular intervals (e.g., every week, every day, every four hours, etc.), upon the request of a user, or the like. In some embodiments, the application further comprises an analytics module programmed to process the identified subset of the plurality of account holders to generate an analytics chart, wherein the analytics chart comprises a visualization and analytic information of each of the identified subset of the plurality of account holders; and display the analytics chart to a user. In some embodiments, the visualization comprises a geospatial visualization. In some embodiments, the analytics module is programmed to generate the analytics chart and display the analytics chart to the user in real time, near real-time, just-in-time, at regular intervals (e.g., every week, every day, every four hours, etc.), upon the request of a user, or the like.

Another aspect of the present disclosure provides a non-transitory computer readable medium comprising machine-executable code that, upon execution by one or more computer processors, implements a method for anti-money laundering (AML) analysis, the method comprising: (a) obtaining, by the computer, a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; (b) applying, by the computer, a trained algorithm to the dataset to generate a money laundering risk score for each of the plurality of account holders and the output of the trained algorithm further comprises key risk drivers for each money laundering risk score; and (c) identifying, by the computer, a subset of the plurality of account holders for investigation based at least on the money laundering risk scores of the plurality of account holders.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

FIG. 8 shows an example of a portion of an AML dashboard which is programmed or configured to provide a way for users to adjust the alert date, manage the notifications, or add additional alert triggers on incoming data.

FIG. 14B shows an example of how a machine learning model may adapt to evolving risk typologies.

FIG. 14E shows an example of how the machine learning model may be trained to use features to detect money laundering of all risk typologies.

FIG. 14F-14H show examples of how the machine learning model may use a set of machine learning features designed to provide robust coverage of all types of digital information that might be used to identify suspicious activity.

FIG. 14I shows an example of how the machine learning model may provide interpretability for surveillance and investigation analysts.

FIG. 15 shows an example of how the machine learning model may use natural language processing (NLP) to identify similarities in accounts, account holders, and account information.

FIG. 18 shows an example of how the analytics may be described using various classes based on the predominant mode of issue (e.g., placement, layering, foreign exchange, structuring, suspicious actions, transaction, and account).

DETAILED DESCRIPTION

Figure 1:
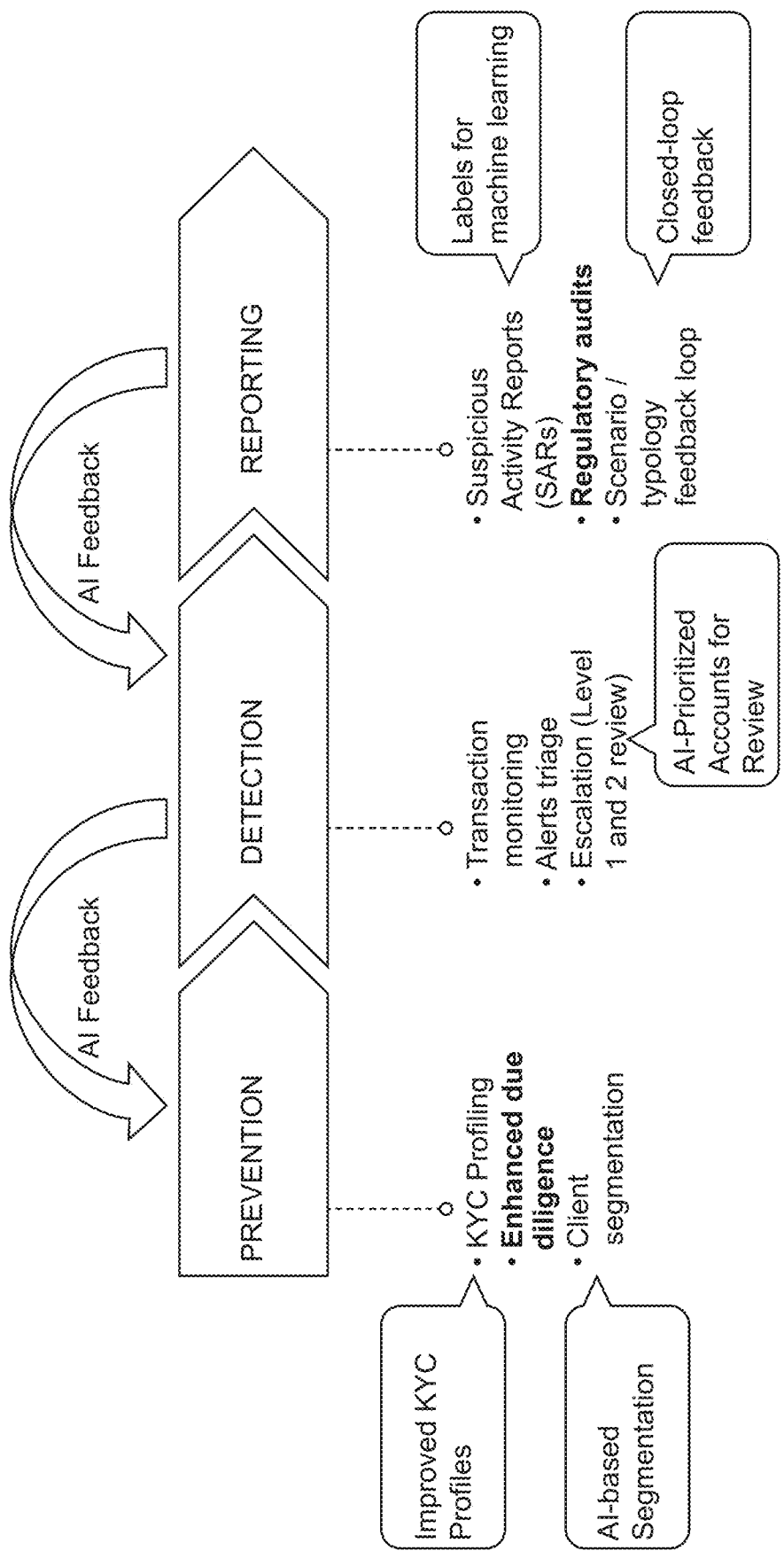
FIG. 1 shows an example of a typical AML business process, comprising prevention, detection, and reporting.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implement, perform, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Recognized herein is the need for systems and methods for improved anti-money laundering (AML) analysis using machine learning techniques, which may be applied to more accurately identify accounts or account holders for investigation. Such systems and methods for improved AML analysis may benefit institutions (e.g., banks) by, for example, improving AML operational efficiency, reducing regulatory exposure, and reducing reputational risk. The present disclosure provides systems and methods that may advantageously apply machine learning to accurately manage and predict accounts and account holders with money laundering risk. Such systems and methods may allow accurate predictions of money laundering risk based on analysis of account variables based on aggregated data from multiple disparate data source systems, identification of suspicious accounts or account holders for investigation, and identification of actionable recommendations to users, all in real time, near real-time, just-in-time, at regular intervals (e.g., every week, every day, every four hours, etc.), upon the request of a user, upon the request of a user, or the like.

Systems and methods of the present disclosure may apply machine learning to Anti-Money Laundering (AML) efforts to increase accuracy in identification of suspicious activity and uncover new modes of fraud. For example, AML applications may be workflow-enabled applications, such that compliance officers can gain operational efficiency in reducing the number of false-positive alerts and improve allocation of compliance resources, focusing on high-value investigations. AML applications may help surveillance compliance analysts and financial crime managers by prioritizing suspicious accounts by likelihood of fraudulent activity and quantity of assets at-risk. The AML applications may also integrate and reconcile numerous sources of information (e.g., data sources) in real-time, near real-time, just-in-time, at regular intervals (e.g., every week, every day, every four hours, etc.), upon the request of a user, or the like, as described elsewhere herein.

Systems and methods of the present disclosure may provide a single source of all relevant information, such that compliance analysts can perform all necessary investigation within a single platform and take action to create a case in an associated case management system once a suspicion about an account or account holder is confirmed. The machine learning-enabled prioritization can be complemented by a suite of advanced analytics to support interpretability and faster triage. Together, compliance teams can dramatically improve operational efficiency in AML activities.

Systems and methods of the present disclosure may use machine learning algorithms powered by dozens, hundreds, or thousands of complex analytic features that correlate high-frequency transactions (e.g., credits and debits) with reference lists, account information, and account holder information. Examples of analytic features may include: high velocity funds, transaction size similarity in related accounts, a number of unique transaction locations, suspicious foreign entity connection, deposit amount variance, cash ratio, and graphs of transactions in space and/or time. Each analytic output may feed into a machine learning model, which classifies every account or account holder with a money laundering risk score. Such money laundering risk scores may be updated in real-time, near real-time, just-in-time, at regular intervals (e.g., every week, every day, every four hours, etc.), upon the request of a user, or the like, with every new transaction, account, account holder, or list change.

In a further embodiment, the AML application can track key performance metrics of AML activity to ensure operational improvement over time and provide summary-level information about recent verified illegal activity and current suspicious cases. In addition, the application can comprise a user interface (e.g., a graphical user interface, GUI) which is programmed or configured to display visualizations of output data (e.g., geospatial views and watch-lists), which may be applied to summary-level data or account-level information as desired.

In an embodiment, the AML application can be built on an integrated platform which enables real-time or near real-time integration as well as extensibility in new data sources, scalability in computing, and flexibility to develop and iterate machine learning models in production.

In an embodiment, the AML application supports identification of at-risk assets. For example, information of accounts or account holders can be analyzed to prioritize the accounts or account holders by the highest expected money laundering cumulative amount, weighing the likelihood of fraudulent activity by the estimated amount of laundered funds. Classification of illegal activity can be improved through machine learning training on a set of confirmed money laundering cases and associated transaction and account information or account holder information. In addition, advanced analytics can support machine learning interpretability and increase investigation efficiency based on targeted and actionable root issue identification. The AML application can improve customer satisfaction by reducing the number of unnecessary investigations due to more accurate predictions.

In an embodiment, the AML application supports AML operational efforts, thereby benefitting compliance officers. For example, streamlined data integration of numerous systems can enable faster case triage and escalation to field investigation teams. AML operational efforts can incorporate managed workflows, which supports business processes for investigation. In addition, bi-directional integration with case management system can enable case creation with accurate data, thereby reducing back-office errors and speeding case resolution time.

In an embodiment, the AML application helps compliance investigators identify suspicious activity that is otherwise identified through other business processes, resulting in timelier regulatory reporting.

In an embodiment, the AML application helps identify additional clients for detailed review that may lead to reporting more suspicious activity to authorities, resulting in improved overall compliance with regulatory requirements (e.g., Bank Secrecy Act, Patriot Act).

In an embodiment, the AML application supports regulatory requirements, thereby yielding benefits to regulatory exposure reduction. For example, the AML application can enable consistent reporting on potentially fraudulent activity for contractual and regulatory reporting purposes. Improved asset recovery and suspicious activity identification can reduce at-risk capital and asset movement. In addition, improved AML efforts can confer an advantageous position to a bank as a global leader in fighting crime and terrorist activities.

In an embodiment, the AML application supports user groups comprising individuals such as compliance analysts. Compliance analysts may be responsible for supporting trade and transaction surveillance teams in identifying and escalating money laundering activity. They may perform a second line of defense and operate within risk frameworks and constantly seek to apply improved systems and methods for surveillance and illegal activity identification.

Using systems and methods of the present disclosure, users (e.g., compliance analysts) can analyze transactions and trades using systems like SMARTS, SWIFT and Actimize. Such users can understand regulatory requirements and apply risk frameworks to account activity. They can also escalate activity outside of risk corridors (e.g., to financial crime officers).

Using systems and methods of the present disclosure, users can perform a variety of tasks. First, a user may review current pipelines of at-risk accounts as well as view trends of group performance in recent months. The user may have a queue of cases to triage as well as open investigations on which to follow-up. Second, users may assess key performance indicators against targets. Third, users may identify at-risk accounts and assets using machine learning scores (e.g., money laundering risk scores). Fourth, users may use robust filtering options to find accounts, transactions, blacklist accounts or account holders, etc. across an entire population of accounts or account holders. For example, filters may return sorted results according to the likelihood of illegal activity by default to ensure emphasis on the accounts or account holders with the highest likelihood, risk, or suspicion of illegal activity.

Fifth, a user may perform a deep dive into an account or account holder to triage and determine whether escalation is necessary (e.g., further investigation). For example, the user may visualize transactions and analytics using charting features. The user may correlate all relevant sanction and PEP list information for associated accounts. As another example, users may assign accounts for triage and review among team members to prevent duplicate reviews. A user may decide whether to escalate. If escalation is required, the user may open a pop-up pre-filled with account or account holder information and direct the investigation to the appropriate crime detection team. If escalation is not required, the user may change a status of the case within the platform to inform the machine learning model that the case is not suspicious. A user may also add accounts or account holders to a watch list for review at future time, setting an alert for a future point in time. If a user changes the status of a case, such a change can be reviewed later and used to train one of the algorithms described herein.

Sixth, a user may review existing watch-list accounts. Seventh, a user may review previous illegal activity for reference. For example, the user may wish to persist prior cases of fraudulent activity for posterity and cross-training purposes.

Financial crime managers may be responsible for managing a distributed team of financial crime analysts who will perform AML activities and make investigative deep-dive recommendations. Their primary goals may include oversight of suspicious cases in a pipeline, coordination and cross-training among analysts, and monitoring of team performance metrics. Financial crime managers may perform a variety of tasks. For example, financial crime managers may determine the alignment between financial crime analyst needs and the software and other resources required to carry out tasks. As another example, financial crime managers may monitor and track team and individual performance, including asset recovery, hit-rate of investigations, and team operational efficiency. Further, financial crime managers may conduct cross-training to ensure all team members are capable of assessing illegal activity using existing tools and applications.

Financial crime managers may use systems and methods of the present disclosure to perform a variety of tasks. For example, financial crime managers may include key performance metrics into the application dashboard to properly assess and expose performance against targets. As another example, financial crime managers may set alerts on investigation progress in aggregate. Further, financial crime managers may review previously verified cases of fraud to support identification of new machine learning features or user interface (UI) enhancements. Financial crime managers may support cross-training through team reviews of application features and machine learning outputs.

Compliance and risk officers may be responsible for ensuring all investigations meet rigorous standards and are documented sufficiently for investigative authorities and based on regulatory requirements. Compliance and risk officers may use systems and methods of the present disclosure to perform a variety of tasks. For example, compliance and risk officers may define the transaction data and relational information required to report to outside governmental and crime authorities. As another example, compliance and risk officers may support the machine learning interpretability process to ensure some level of traceability in the machine learning-identified suspicious case and the investigative trigger employed by analysts. Further, compliance and risk officers may generate ad-hoc reporting for third-party entities (e.g., based on compliance and regulatory requirements).

In an aspect, the present disclosure provides computer-implemented method for anti-money laundering (AML) analysis, comprising: (a) obtaining, by a computer, a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; (b) applying, by the computer, a trained algorithm to the dataset to generate a money laundering risk score for each of the plurality of account holders; and (c) identifying, by the computer, a subset of the plurality of account holders for investigation based at least on the money laundering risk scores of the plurality of account holders.

In some embodiments, the AML may comprise a user interface (UI) such as a graphical user interface (GUI) which may be programmed or configured to provide information such as executive-level key performance indicators, summary information about the current top suspicious cases, alerts set up for watch list cases, and a view into recently verified cases of illegal activity.

FIG. 1 shows an example of a typical AML business process, comprising prevention, detection, and reporting. Systems and methods of the present disclosure may use artificial intelligence methods to provide feedback between reporting and detection phases, and between detection and prevention phases. For example, in the prevention phase, such artificial intelligence methods may use artificial intelligence for improved know your customer (KYC) profiling, enhanced due diligence, and AI-based client segmentation. As another example, in the detection phase, such artificial intelligence methods may use artificial intelligence for transaction monitoring, alerts triage, and prioritizing accounts for review and escalation (level 1 and 2 review). As another example, in the reporting phase, such artificial intelligence methods may use labels for machine learning (e.g., for suspicious activity reports, SARs), regulatory audits, and a closed-loop feedback such as a scenario/typology feedback loop.

Figure 2A:
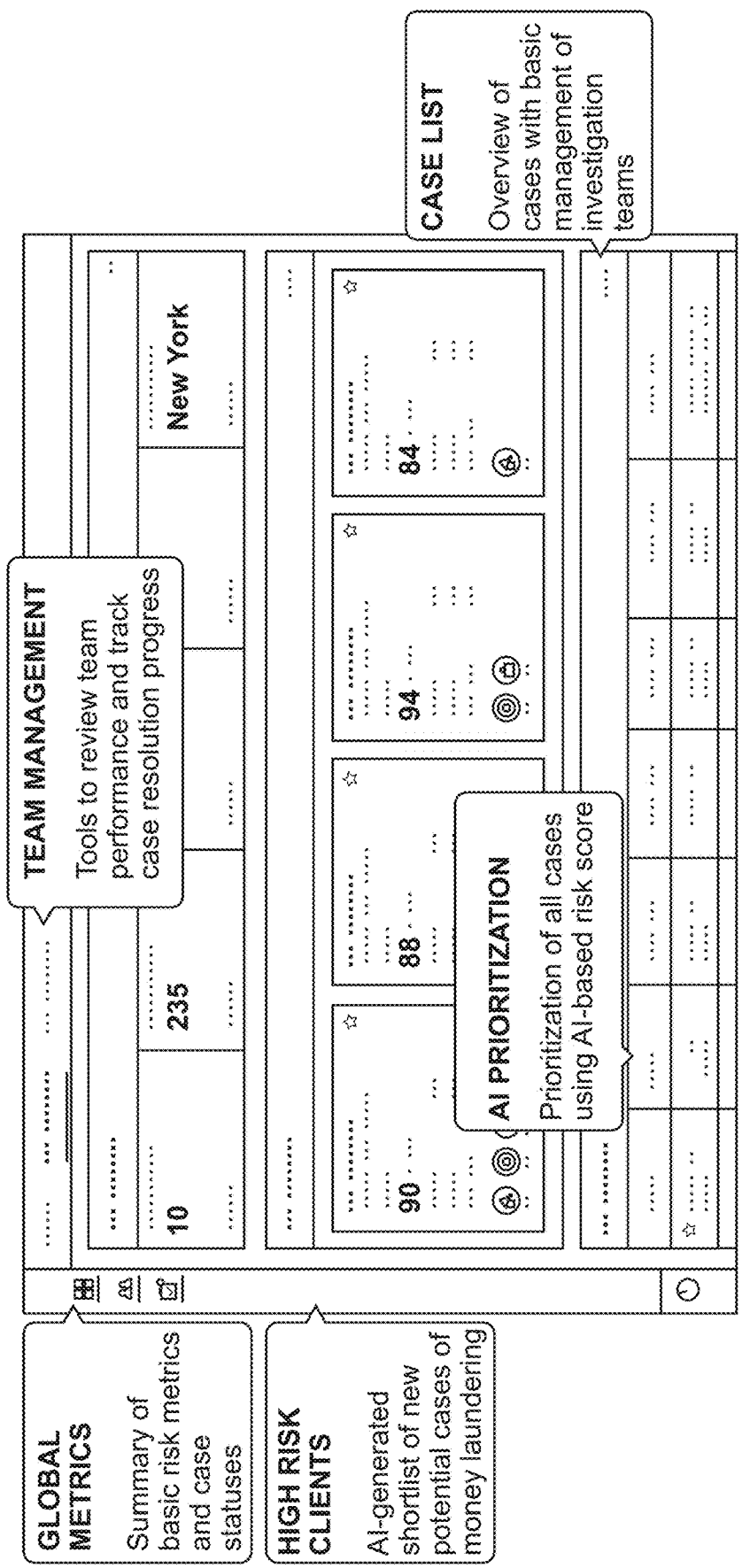
FIGS. 2A and 2B show examples of an Anti-Money Laundering (AML) dashboard of the AML application.
Figure 2B:
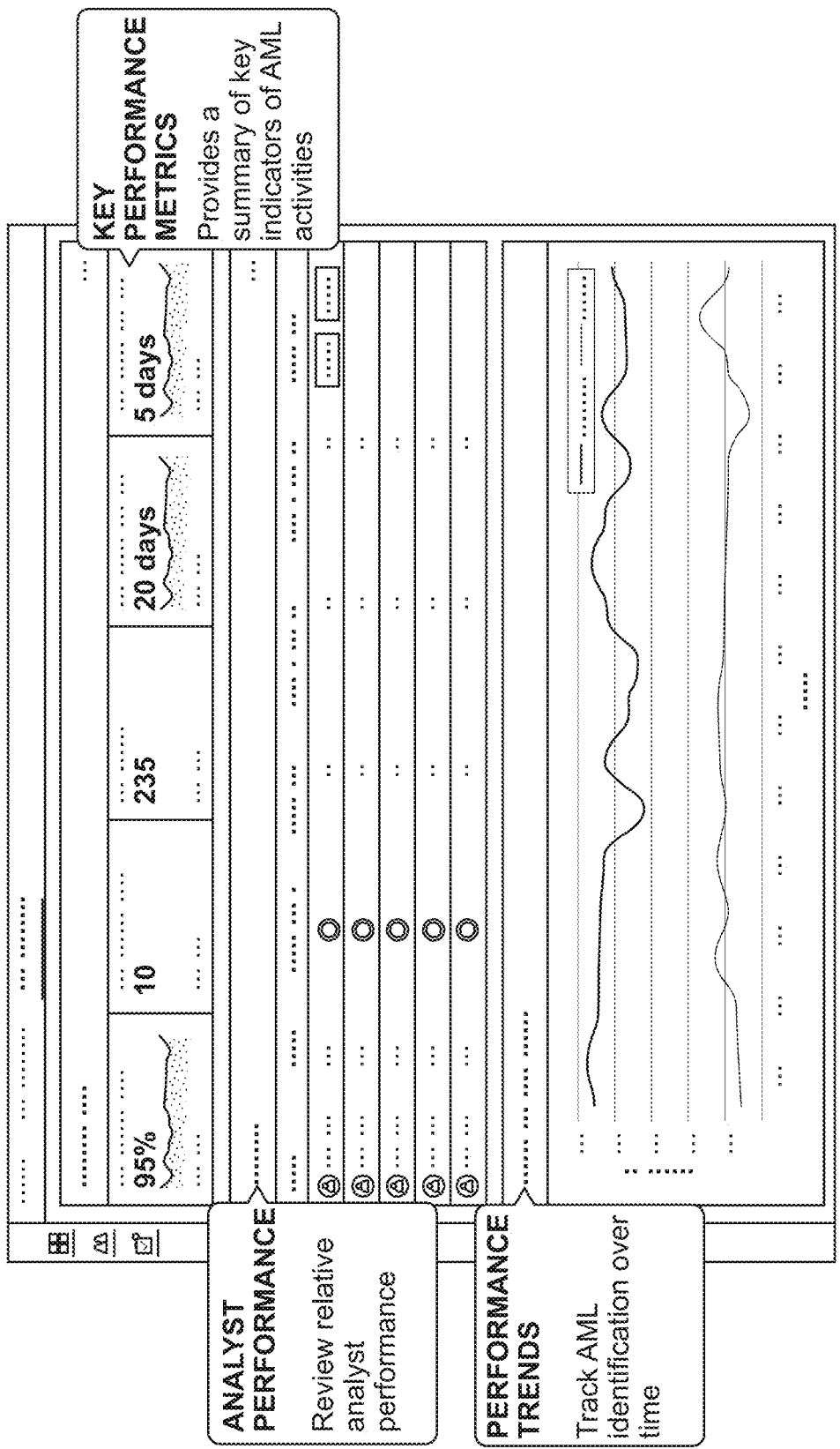

FIGS. 2A and 2B show examples of an Anti-Money Laundering (AML) dashboard of the AML application. The insight-driven dashboard has numerous components designed to focus users on targets as well as new opportunities. All values are updated as new data are integrated to the AML platform, ensuring that users are viewing the most up-to-date analytic results and makeup of the suspicious cases.

The AML dashboard may be programmed or configured to display a set of global metrics (e.g., a summary of basic risk metrics and case statuses), a "watch list" of high-risk clients, a set of team management tools (e.g., to review team performance and to track case resolution progress), an AI prioritization of all cases, a case list (e.g., containing an overview of cases with basic management of investigation teams), analyst performance (e.g., to review relative analyst performance), performance trends, and key performance metrics (e.g., to provide a summary of key indicators of AML activities).

The AML dashboard may be programmed or configured to display a "watch list" of high-risk clients (e.g., an artificial intelligence-generated shortlist of new potential cases of money laundering). Users can set watch-lists for suspicious accounts that may require review in a future month. Analysts are typically knowledgeable of when a case has sufficient evidence of illegal activity to warrant an escalated investigation. The AML dashboard can support their subject matter expertise and enable the watch-list feature to provide automatic reminders for them to review accounts in detail again.

The AML dashboard may be programmed or configured to display a prioritized list of top cases based on an artificial intelligence-based (e.g., machine-learning based) risk score. For example, top cases may be classified by the suspicious accounts or account holders that meet a predetermined risk threshold used by the machine learning model. Among the set of top cases, the interpretation of machine learning can yield insight to the actual mode of illegal activity that most leads to and explains the suspicious nature of the account or account holder.

The AML dashboard may be programmed or configured to display performance trends (e.g., to track AML identification over time). For example, monthly recovered or identified assets can be charted against the prior year and targets. Such performance trend information can be provided to guide executives to the overall group performance by month and to increase transparency.

The AML dashboard may be programmed or configured to display recent verified cases. Users may be interested in learning from other analysts' identified accounts of verified financial crime. The AML platform can provide an easy method for users to review recent cases to mine for additional information or reach out to assigned analysts to discuss and improve cross-training. Using this display, executives can also see the value of the application in the recently identified cases as well as the risk score (e.g., money laundering risk score) as of the investigation date.

The AML dashboard may be programmed or configured to provide a workflow-focused and machine learning-based approach to supporting compliance analyst activities. As such, compliance analysts may navigate the main page where they can review suspicious cases identified by the machine learning algorithm. When users navigate to the Suspicious Cases page, they can view a prioritized list of all account and/or account holders displaying summary information as well as a set of filtering capabilities to identify a different set of cases. Users can also toggle between the main grid of prioritized cases and the geospatial view of prioritized cases. The main list page can provide a variety of information and robust features even before a user dives in to the individual account level.

Figure 3:
FIG. 3 shows an example of a portion of an AML dashboard which is programmed or configured to provide a geospatial view of prioritized cases.

The AML dashboard may be programmed or configured to provide a geospatial view of prioritized cases, as shown in FIG. 3. Analysts may be provide given an option to geospatially view the top suspicious cases, which may be color coded by the machine learning likelihood score (e.g., money laundering risk score). In addition, cases may be indicated by differently sized icons (e.g., circles of different radii) to indicate the relative account sizes related to the cases. This geospatial view may provide insight to target areas for investigation. Clustering and heat maps can reveal additional insights to the distribution of risk among account types, account holders, and geographic areas.

Figure 4:
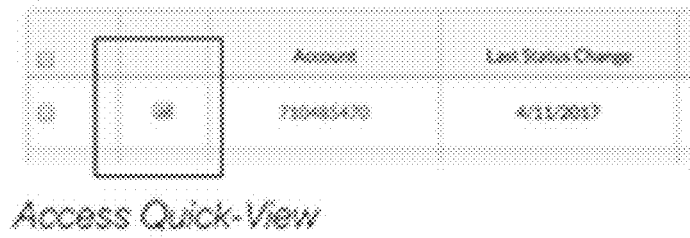
FIG. 4 shows an example of a portion of an AML dashboard which is programmed or configured to provide a way for users to triage suspicious cases.

The AML dashboard may be programmed or configured to provide a way for users to triage suspicious cases. Users can access a "quick-view" of each suspicious case in the prioritized list by clicking on the chart button. From this view (as shown in FIG. 4), users are able to view the most important information about each case, plot different time series information, navigate between cases, and manually flag them as "office declined" or "watch list."

Figure 5:
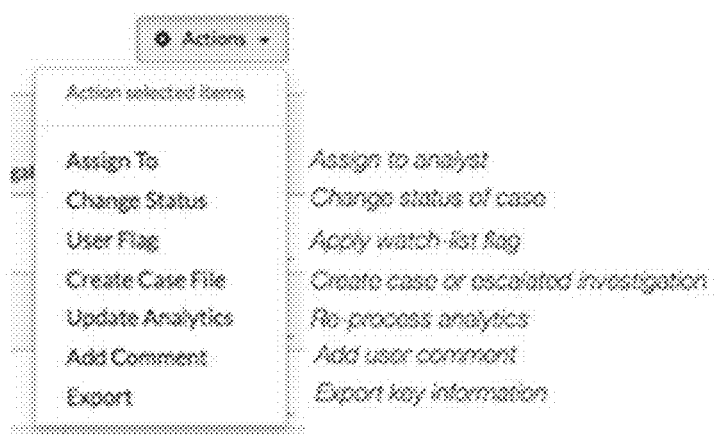
FIG. 5 shows an example of a portion of an AML dashboard which is programmed or configured to provide a way for users to take action in bulk for cases within the main prioritized grid.

The AML dashboard may be programmed or configured to provide a way for users to take action in bulk for cases within the main prioritized grid, as shown in FIG. 5.

Figure 6:
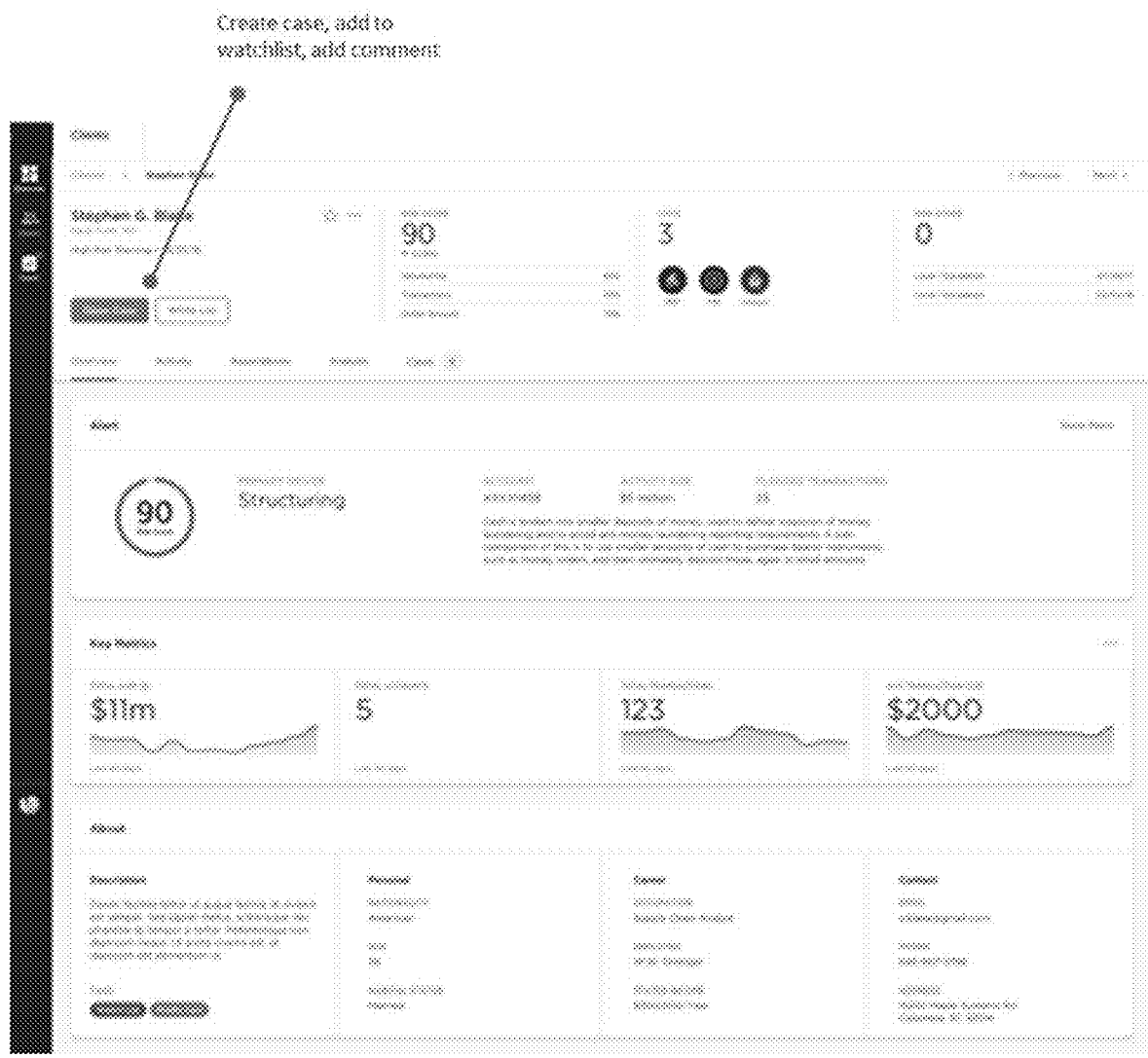
FIG. 6 shows an example of a portion of an AML dashboard which is programmed or configured to provide a rich set of information in history about the suspicious account or account holder that analysts may otherwise have to spend time querying in various systems.

The AML dashboard may be programmed or configured to provide account details. An analyst may spend much time investigating the details of each suspicious case identified by the application. With dozens of data sources integrated to one federated cloud image, the AML platform can provide a rich set of information in history about the suspicious account or account holder that analysts may otherwise have to spend time querying in various systems. These may be grouped in navigation tabs within the detail page, as shown in FIG. 6. The AML dashboard may be programmed or configured to allow a user to create a case, add a case to a watch list, and add comments about a case.

The AML dashboard may be programmed or configured to provide information including details and location, suspicious activity, charts, customer (account holder) interactions, blacklists, account details, user comments, commercial status, transactions, and flags and alerts.

Figure 7:
FIG. 7 shows an example of a portion of an AML dashboard which is programmed or configured to provide alerts and a watch list.
Figure 8:
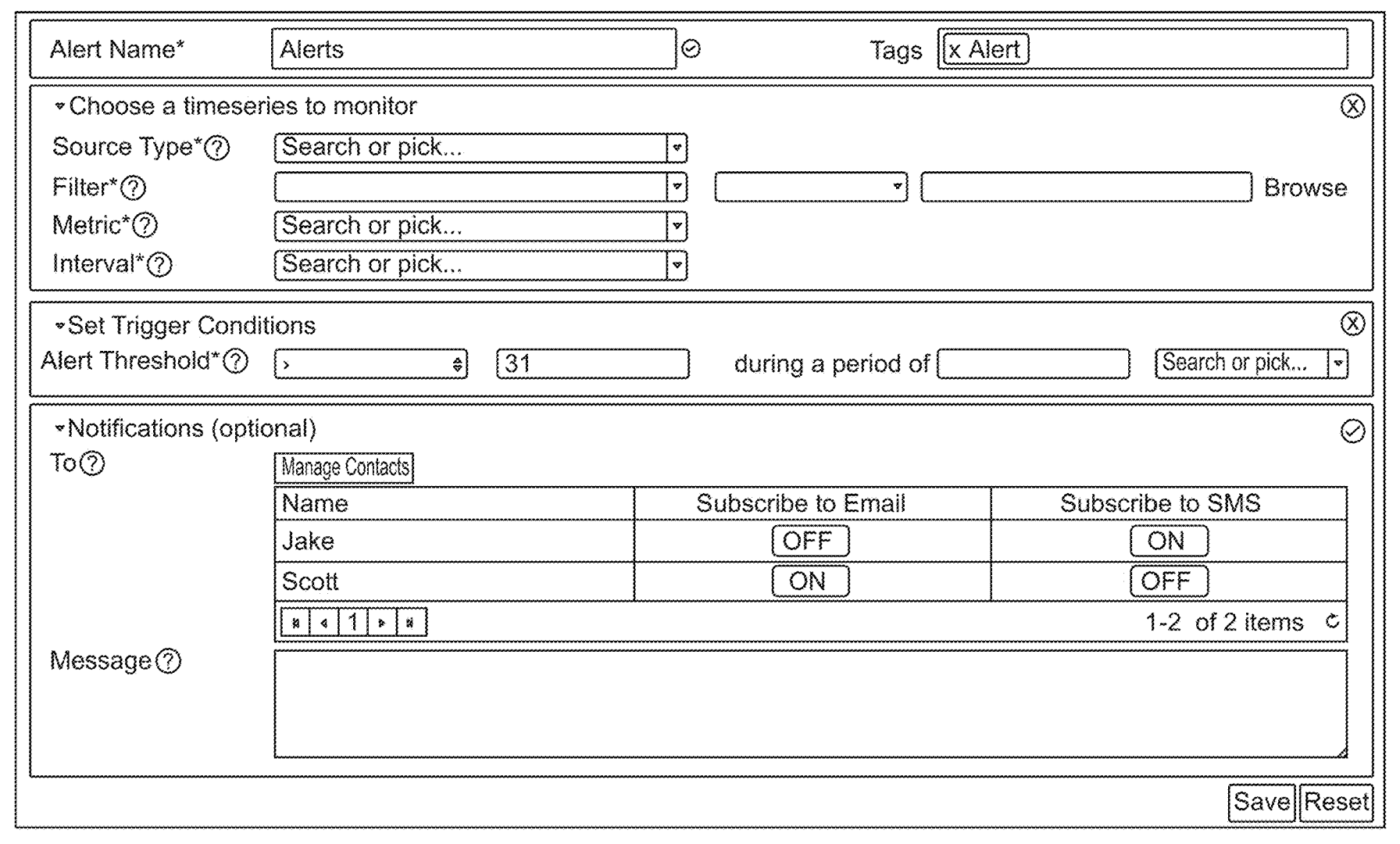

The AML dashboard may be programmed or configured to provide alerts and a watch list, as shown in FIG. 7. Users are able to generate alerts to track suspicious cases over time, apply "watch-list" flags to review at later date, and utilize the AML framework to inform other individuals. The dialog box can allow the user to set watch-list cases and then direct them to set a timestamp and set of individuals to receive the pending alert. Using the AML platform and an Alerts Engine, analysts and other application users may adjust the alert date, manage the notifications, or add additional alert triggers on incoming data, as shown in FIG. 8.

Figure 9A:
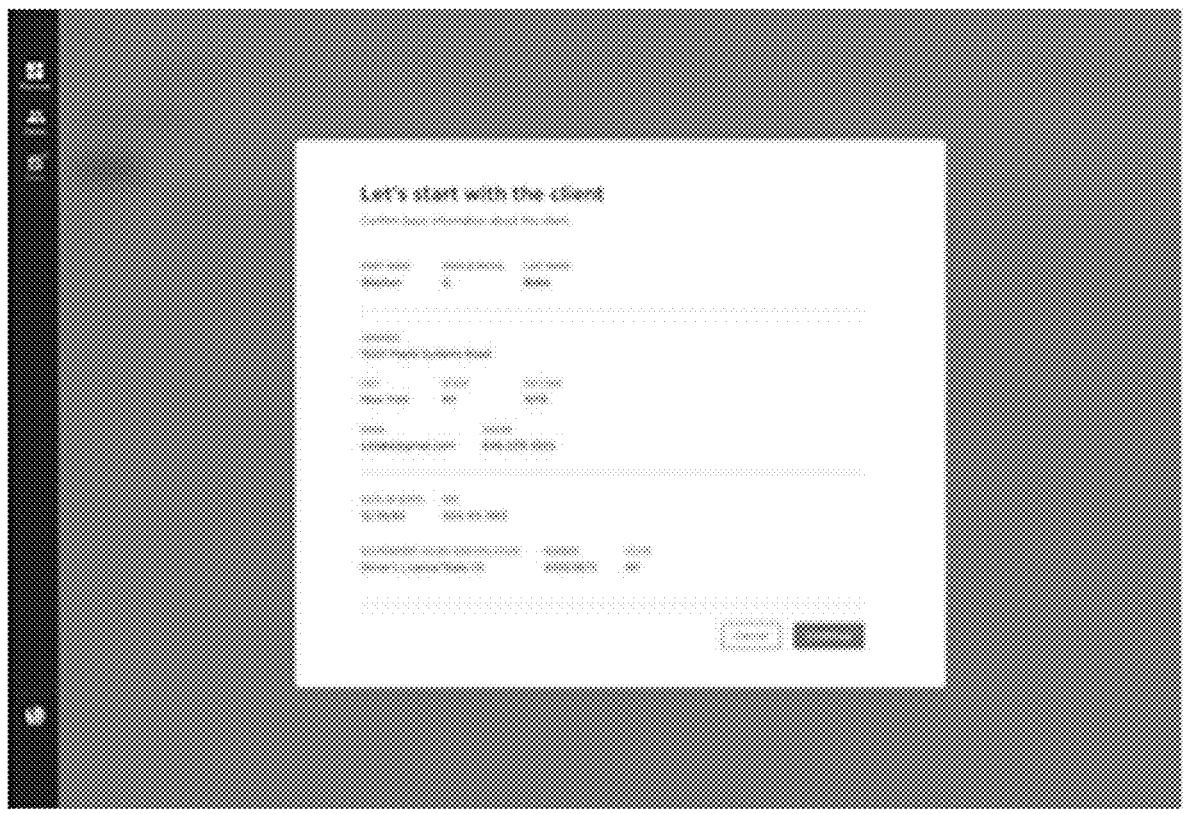
FIGS. 9A, 9B, and 9C show examples of a portion of an AML dashboard which is programmed or configured to provide a way for users to select a case file creation pop-up from the action menu drop-down for single or bulk cases.
Figure 9B:
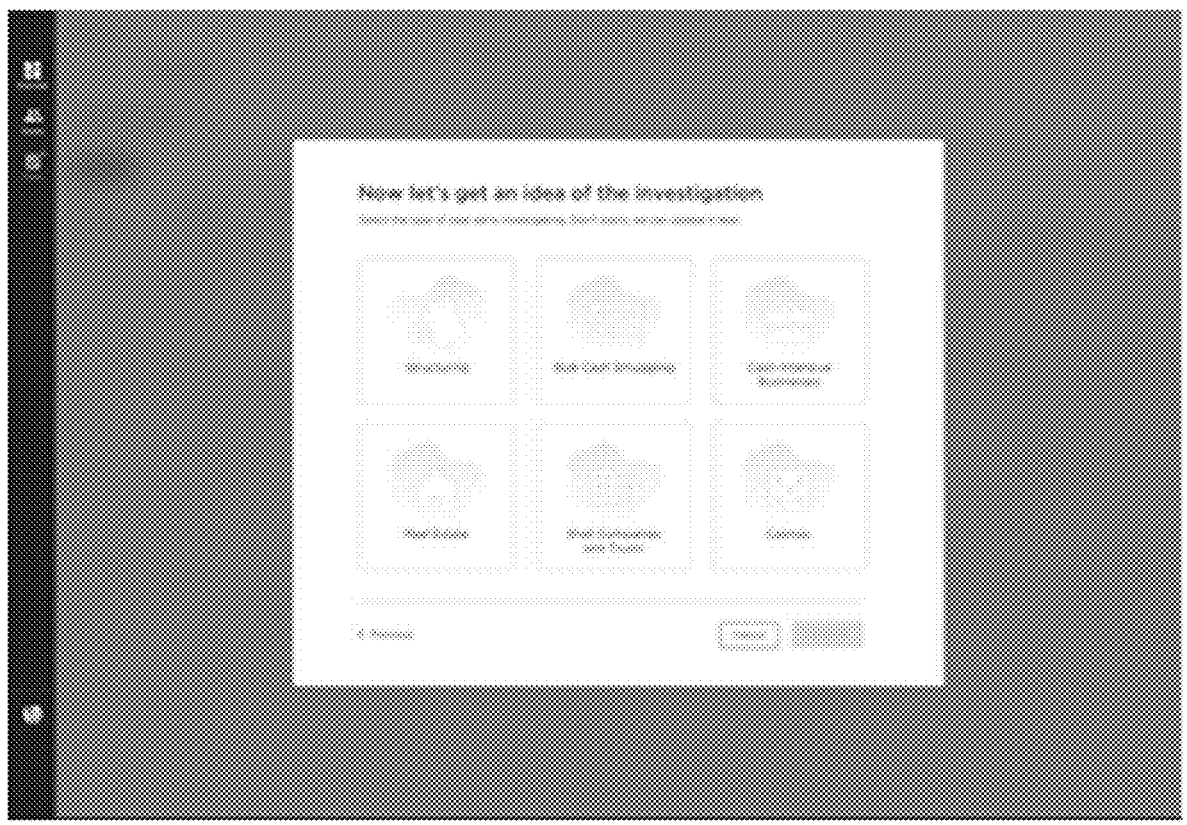
Figure 9C:
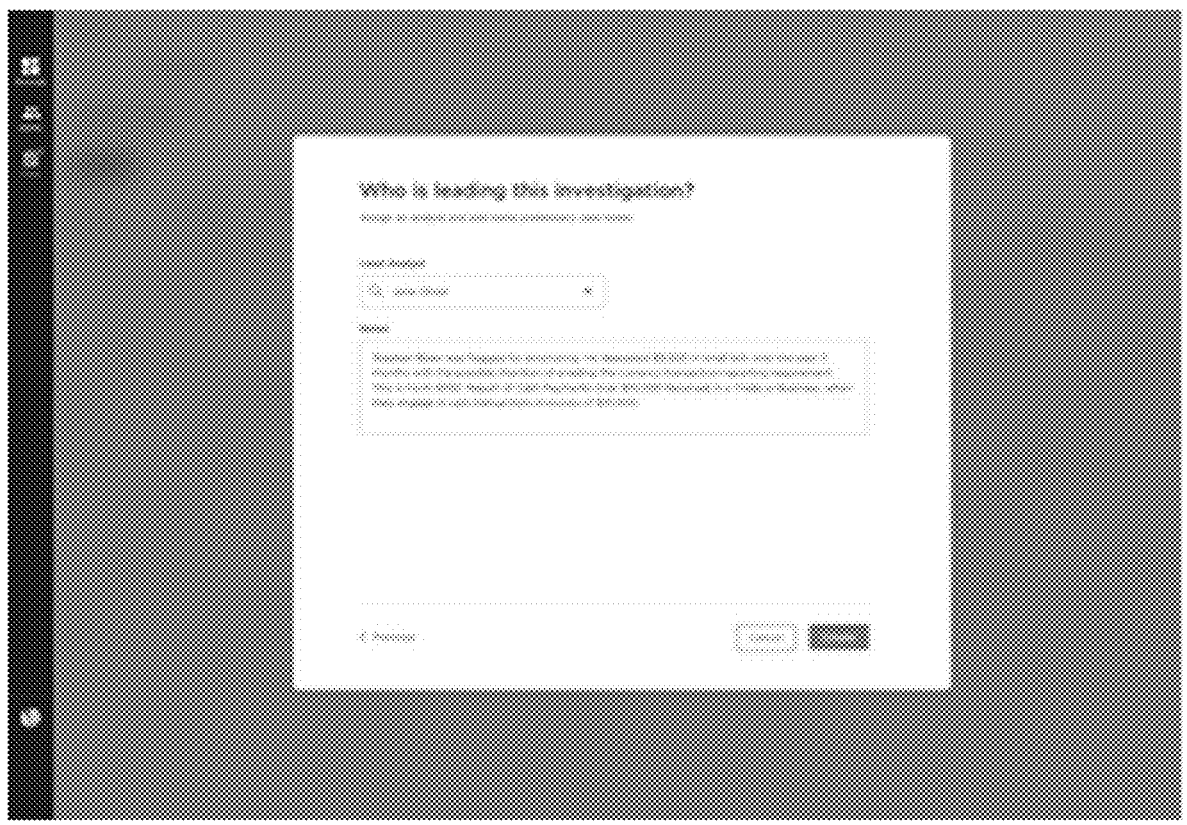

The AML dashboard may be programmed or configured to allow a user to generate cases, as shown in FIGS. 9A, 9B, and 9C. In order to improve the operational efficiency gain that users can achieve using the AML platform, the AML dashboard can provide the ability to create a case file directly from the application to the designated downstream source system. This approach can serve multiple purposes, such as allowing users to be more efficient and to avoid switching systems to escalate the case, allowing the case creation to be more accurate when automated using the most recent information within the AML platform, and allowing cases to be created with a unique identifier that will help inform the machine learning model when the outcome of the case is received through the normal inbound integration process. The case file creation pop-up can be selected from the action menu drop-down for single or bulk cases.

The AML dashboard may be programmed or configured to use a variety of relational and transactional data to correlate all account activity and identify those accounts or account holders most likely to be engaging in illegal activity. Data sources may span third-party information like regulatory catalogs and PEP lists, to account and account holder information and transactions of various monetary instruments. Data sources may include, for example, account and account holder information, transactions, online and retail transactions, trading surveillance platforms (e.g., trade history), order management systems (e.g., information about securities orders), foreign exchange rate history, blacklists (e.g., criminal and terrorist databases and sanctioned overseas entities), politically exposed persons, sanction and regulatory catalogs, investigations, and credit bureau databases.

The AML dashboard may be programmed or configured to use a variety of external data sources. In some embodiments, an aggregation module may be programmed or configured to obtain and aggregate datasets from a plurality of disparate sources. For example, the datasets can comprise internal datasets and external datasets. Examples of disparate sources may include smart devices, sensors, enterprise systems, extraprise, and Internet sources. Such datasets may be persisted across one or more data stores to support identification of money laundering activities. These extraprise sources provide contextualized information to the transaction data and account information that come from enterprise systems. For example, Google News can be used as a data source, by using news articles to correlate information across journalism that reference key entities like criminal organizations and PEPs. The AML platform can utilize Google News to further contextualize suspicious accounts, by using sources such as property purchases, Experian, World Bank/IMF, and Intelius. "Property Purchases" may describe integration with land purchase and property purchase filings, which can provide key information to link organizations that are loosely affiliate with known sanctioned or terrorist entities. "Experian" may describe additional third-party context around individuals, which can provide a history of loans, transactions and other accounts. The World Bank/IMF can provide macroeconomic information about various regimes and economic stability around the world, thereby providing context for money movement and further characterize suspicious activities. Intelius can provide search results of public records (social networks, property records, background checks) for individuals ad-hoc.

AML Machine Learning Model

The AML system may comprise a machine learning model configured to analyze information to detect money-laundering risk. The machine learning model may be configured to calculate either or both of two measures of importance independently for each suspicious case: a likelihood of illegal activity (e.g., a probability or a percentage) and an estimated amount of assets at-risk due to illegal activity (e.g., a dollar amount or equivalent). In some cases, the machine learning model may be configured to further calculate measurements of money-laundering risk associated with an account and/or account holder. For instance, a likelihood score indicating money-laundering risk level may be calculated for an account and/or account holder.

The machine learning model may calculate a likelihood score that estimates the similarity of the "unlabeled" accounts and/or account holders with actual cases of illegal activity that were previously investigated and confirmed. The likelihood score can be one output of a classification model applied to the analytic results associated with the account or account holder.

The AML model can apply machine learning to the detection of money laundering and terrorist financing, aggregating and federating weak signals in the data into strong predictors of illegal activity. The approach can be focused on the account and/or the account holder, around which all transactions, related account holders, and regulatory information are related.

The AML model can include a set of "features," which serve as the inputs used by the classification model to determine whether an account is similar to previous instances of financial crime. Features can be based on analytics and may include, for example, aggregated analytic results, metadata, and various derivations from raw data. Analytic results may be aggregated over a standard time window prior to the prediction date, using various aggregation functions (sum, count, maximum, minimum, etc.). Beginning with about 10, 20, 30, 40, 50, 60, 70, 80, 90, 100, 150, 200, 250, 300, or more analytic algorithms, the feature extraction process can generate about 10, 50, 100, 150, 200, 250, 300, 350, 400, 450, 500, 600, 700, 800, 900, 1,000, or more features. Metadata may be associated with the account holder, account type, location, transactions, and branches linked to the potential suspicious case, such as business type, monetary instrument, account opening, postal code(s), and previous statements. Metadata may change over time. In some cases, metadata may be aligned/aggregated with the analytics results corresponding to the same time window.

The AML model can use a machine learning model (e.g., gradient classifiers) to produce a likelihood score. The AML model may comprise a classification model, which uses a set of model parameters obtained by training the classification model using the features of prior confirmed illegal activity cases (e.g., known financial crimes), known false positives, and unlabeled (typically assumed normal) opportunities. Labels (e.g., for training) may include suspicious case resolution and evaluation time.

At run-time, the AML model can be automatically applied with the current parameters and current features to predict a risk score (e.g., money laundering risk score) for each account or account holder, and the most recent score can be recorded and displayed to the user (e.g., through a visualization of data). The history of previously generated risk scores can also available be for investigation within the AML platform. The AML model may be updated in response to new data loaded to the system. The AML model may be updated periodically, upon detection of a change of data (e.g., new data added, a different set of data is selected, a change of labels), or upon a manual update.

Figure 10:
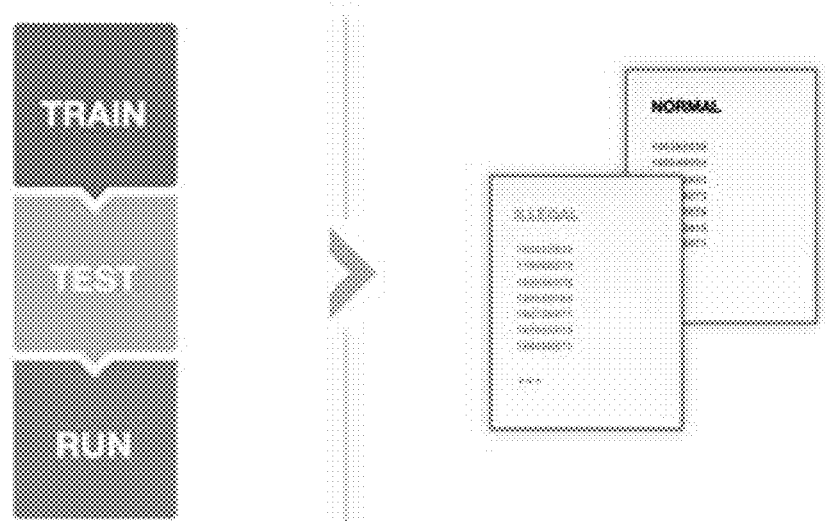
FIG. 10 shows an example of an AML model which may be trained using prior confirmed illegal activity cases.

The AML model may be trained using prior confirmed illegal activity cases, confirmed cases of illegal activity, confirmed cases of suspicious activity, confirmed cases of normal activity, and random sampling from the remaining clients, as shown in FIG. 10.

Figure 11:
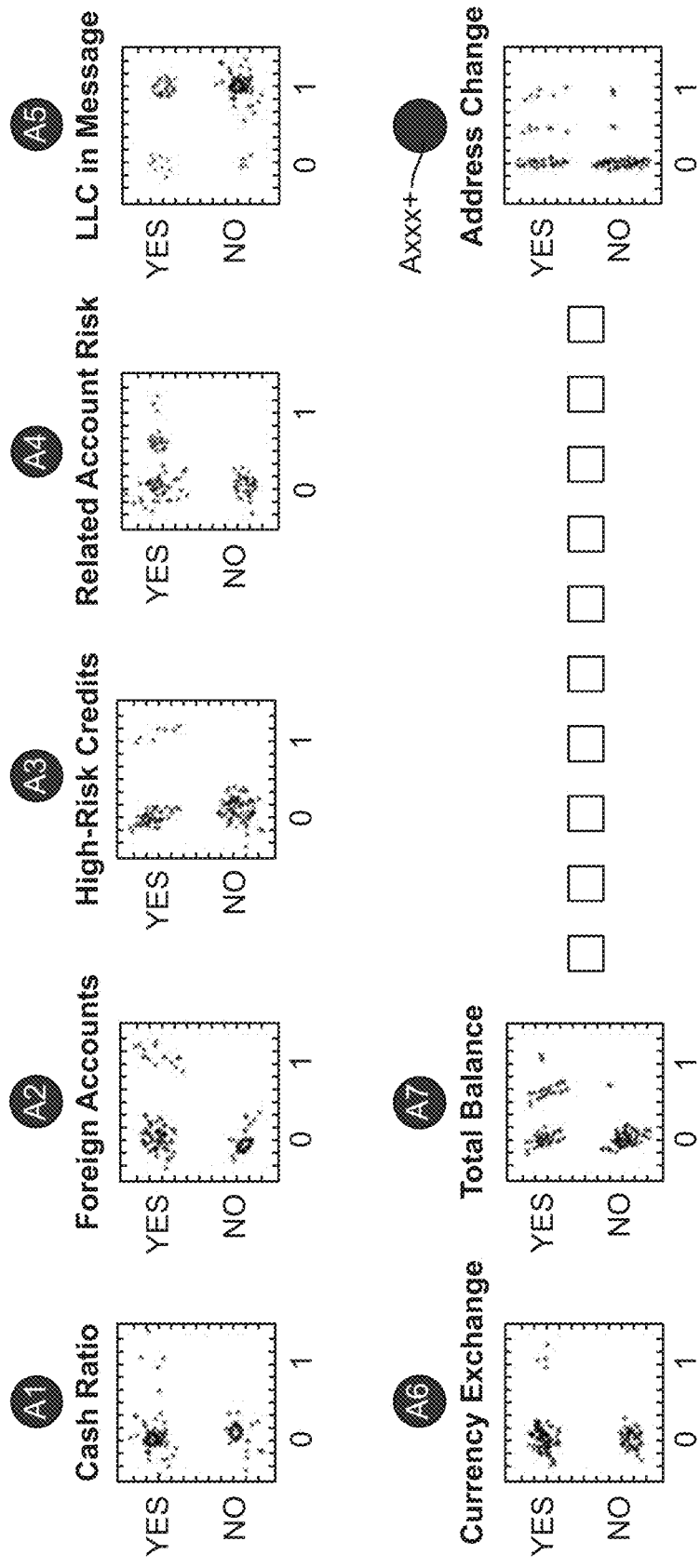
FIG. 11 shows an example of account data sets which are processed through each of the analytic algorithms, or features.

The set of machine learning features of the AML model may be trained using an account training set. Examples of features may include variables indicative of an account having a certain cash ratio, being a foreign entity, having a layering risk, having multiple locations, having a structuring risk, having a certain history of currency exchange, having a certain time between transactions, and having unusual withdrawals. Features may be converted to binary variables (e.g., "yes" or "no") based on thresholding using continuous values. Each account data set is processed through each of the analytic algorithms, or features, as shown in FIG. 11. Examples of features may include binary variables (e.g., "yes" or "no") related to cash ratio, foreign accounts, high-risk credits, related account risk, LLC in transaction message, currency exchange, total balance, and address change.

Figure 12:
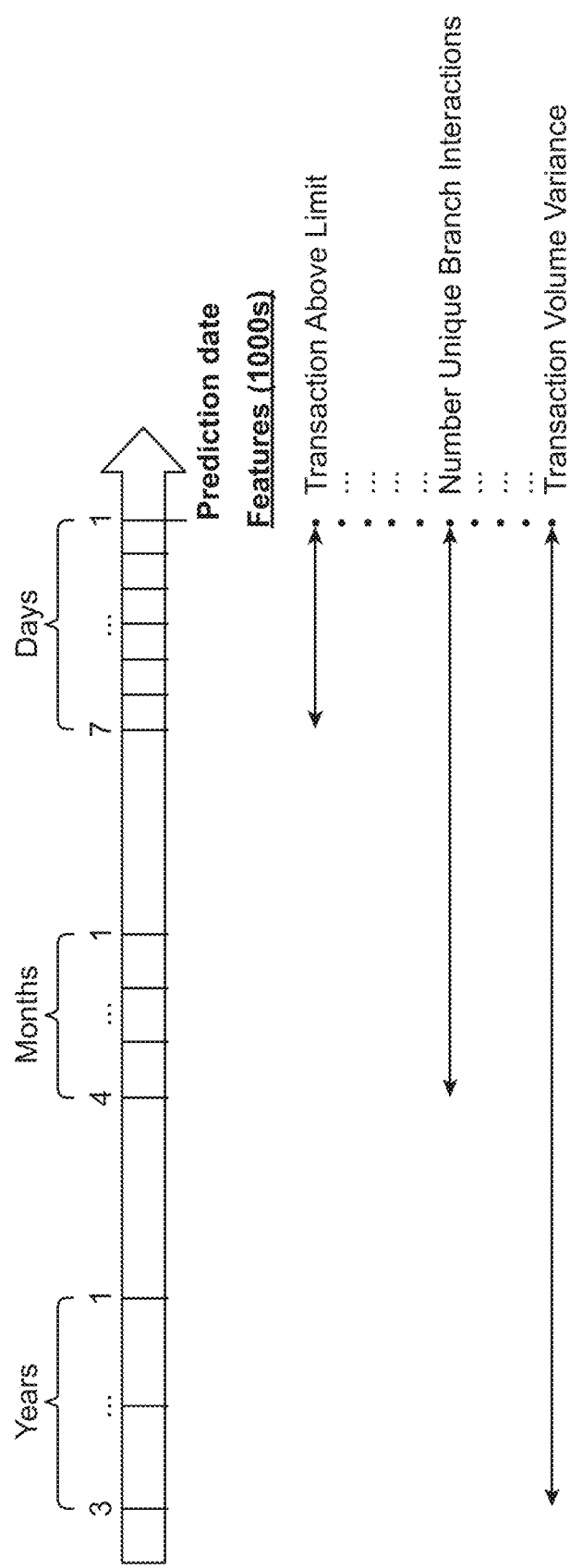
FIG. 12 shows an example of features which may be computed based on the necessary set of data in history for its algorithm or compound feature requirement.

Each feature may be computed based on the necessary set of data in history for its algorithm or compound feature requirement, as shown in FIG. 12. For examples, the necessary set of data may comprise all transactions occurring within a certain duration of time (about 1, 2, 3, 4, 5, 6, or 7 days, about 1, 2, 3, 4, 5, 6, 7, 8, 9, 10, 11, or 12 months, or about 1, 2, 3, 4, 5, or more years). The features may include transactions above a certain limit, a number of unique branch interactions, and a transaction volume variance.

Figure 13:
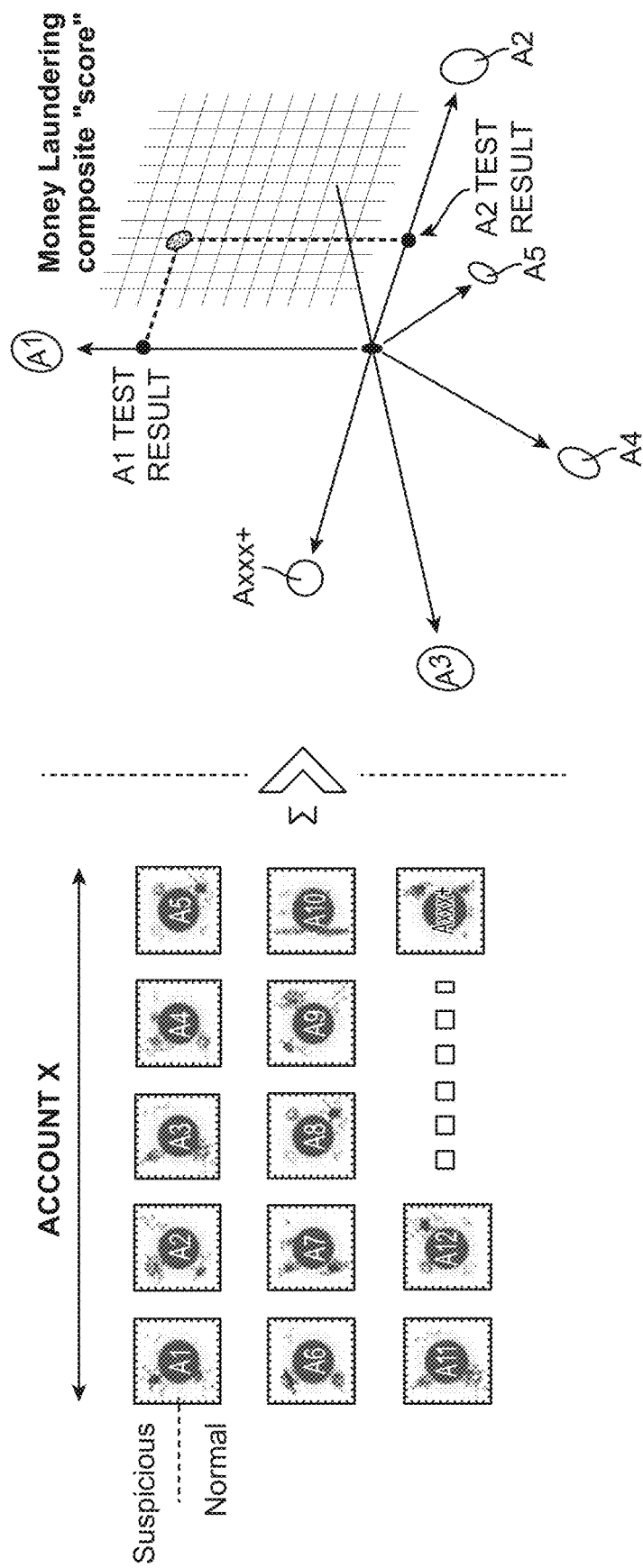
FIG. 13 shows an example of how a machine learning model may analyze illegal actions of an account by processing a set of features for a given account (e.g., "Account X") in high-dimensional space to generate a money laundering composite score.

The machine learning model may analyze illegal actions of an account by processing a set of features for a given account (e.g., "Account X") in high-dimensional space to generate a money laundering composite score, as shown in FIG. 13. Various suitable methods can be used to calculate the money laundering composite score. The money laundering composite score may be calculated based on a linear or non-linear relationship with a set of features. For example, the money laundering composite score may be calculated by, for example, computing a weighted sum of a subset or the entire set of features for the given account. In another example, the money laundering composite score may be the output of a decision tree where each node of the decision tree represents a logical split based on a feature threshold. Account analytic results can be combined in multi-dimensional space and compared to other classified accounts.

Figure 14A:
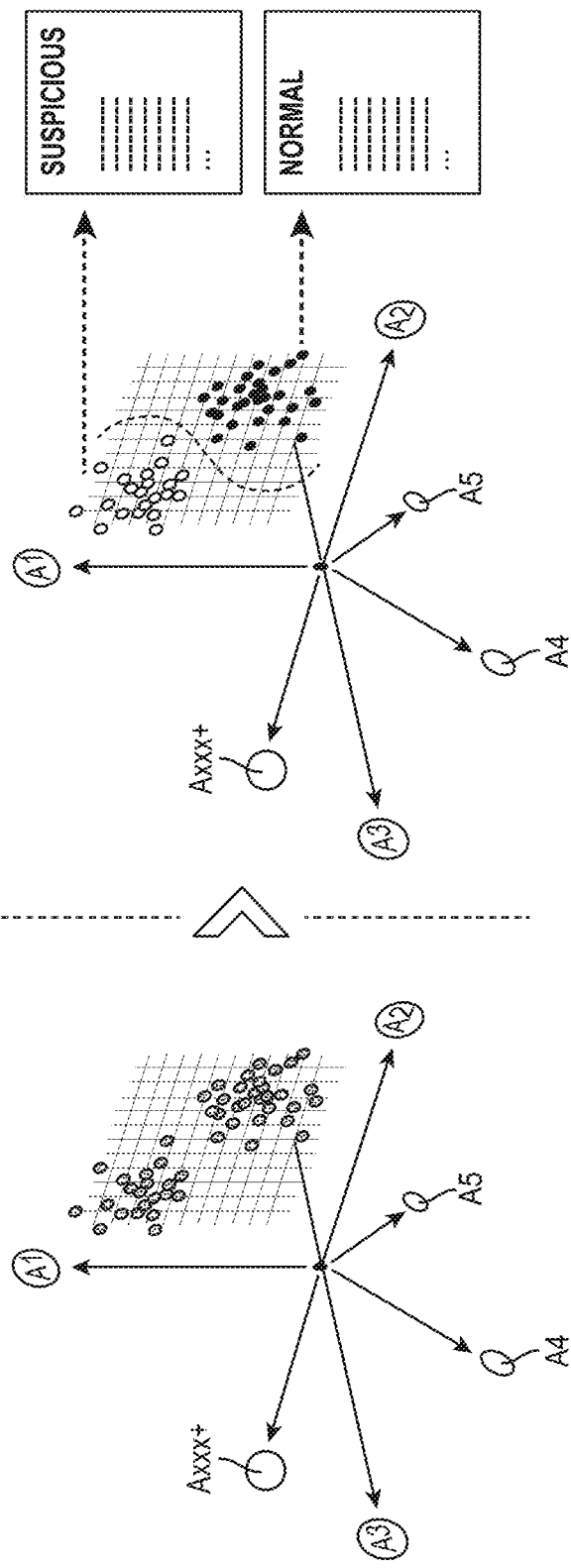
FIG. 14A shows an example of how a machine learning model may perform machine learning based lead classification to identify suspicious typologies, by analyzing account or party composite scores to identify suspicious/illegal and normal accounts or parties.

The machine learning model may perform machine learning based lead classification to identify suspicious typologies, by analyzing account or party composite scores to identify suspicious/illegal and normal accounts or parties, as shown in FIG. 14A. For example, unclassified accounts and their data may be subjected to analytic algorithms and the machine learning classifier to detect accounts or account holders having a high likelihood of illegal activity. The machine learning model may adapt to evolving risk typologies (as shown in FIG. 14B), such that if an unusual account or party is investigated outside of an existing range of suspicion (left), then the range of suspicion can be updated to incorporate the newly identified unusual account or party (right).

Figure 14C:
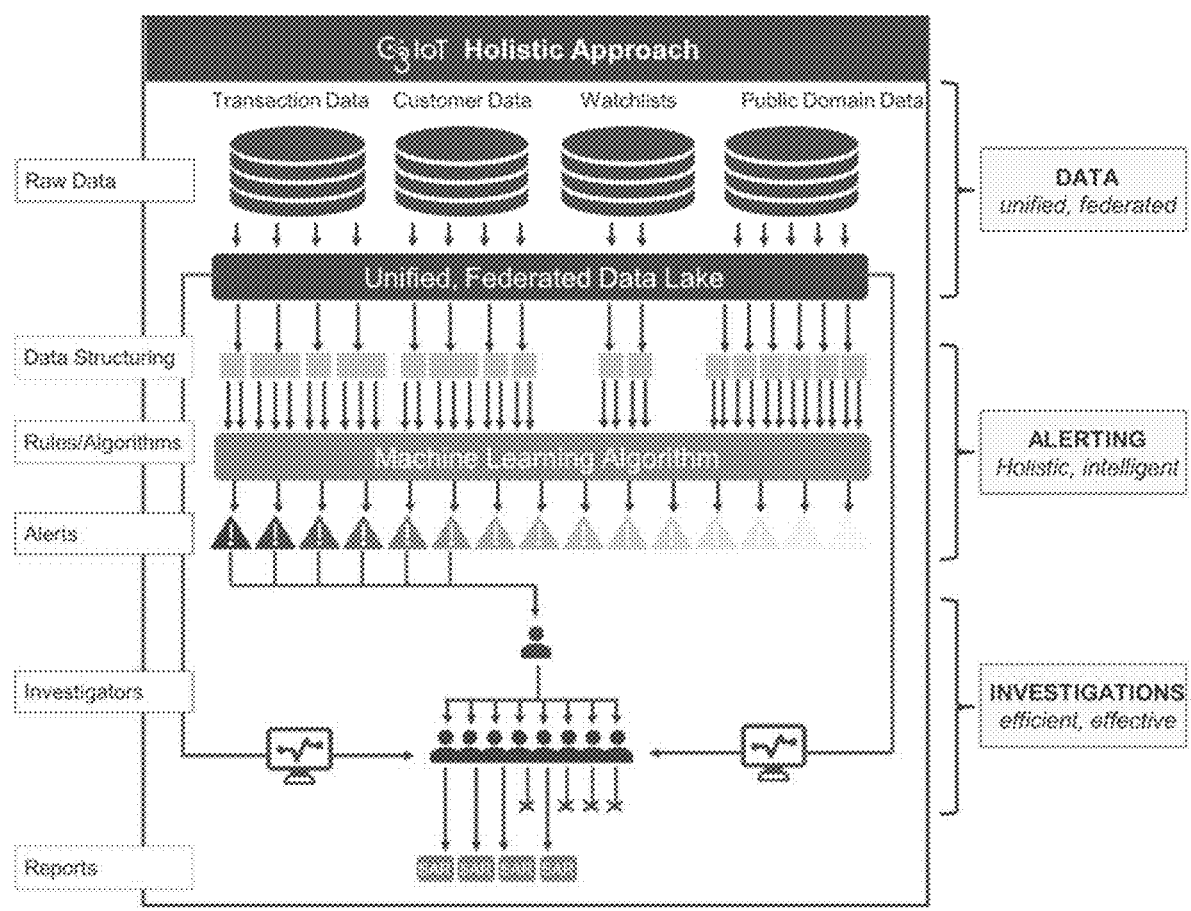
FIG. 14C shows an overview of how the machine learning model may collect or aggregate raw data into a unified, federated data lake, perform data structuring, apply machine learning rules and algorithms, generate alerts, and allow investigators to use the results to generate reports.

As shown in FIG. 14C, the machine learning model may analyze raw data (including transaction data, account holder data, watch lists, and public domain data) across disparate data sources, and unify or aggregate such data into a unified, federated data lake. Such data may be unified into a single system, which is configured to capture news, social media, and other relevant public data, and features in real-time, near real-time, just-in-time, at regular intervals (e.g., every week, every day, every four hours, etc.), upon the request of a user, or the like. The unified, federated data lake may be processed by data structuring and machine learning rules and/or algorithms to generate holistic, intelligent alerts. The data structuring may be performed with hundreds or thousands of parametric manipulations, with algorithms that go beyond static rules to predict holistic risk scores and enable rapid adaptation and configurability to detect evolving risk typologies. The alerts may be viewed by users such as investigators efficiently and effectively. All the data may be maintained in a single UI, eliminating the need for tedious manual collation. In addition, risk-driver insights can enable effective case assignments by managers. Sophisticated visualizations of client transactions and associations can be provided by the machine learning model. Further, effective SAR identification can be performed with minimal false positives. The investigators may prepare reports using the results and/or the visualizations of the machine learning model. The machine learning-based AML system may be advantages over other AML systems, which may feature disparate data sources that are not unified and do not enable near real-time updating of data, narrow and simplistic alerting, and manual investigations that may be less efficient (e.g., in time and costs) and less effective (e.g., in timely identifying suspicious activity).

The machine learning model may be designed to process high-volume, high-frequency, disparate data at massive scale. For example, the machine learning model may feature advantages in integration by enabling unfettered access to disparate data (e.g., account holder data, transaction data, watch list data, news, social media, etc.), in contrast to other systems in which data are siloed in multiple systems and often accessible only by tediously collating information from other teams. As another example, the machine learning model may feature advantages in synthesis by enabling algorithms to consider all relevant data because all data are structured to create hundreds or thousands of signals that fully represent the nuance of information in raw data, in contrast to other systems in which data may be constrained by simplistic or static rules which lack sophistication to fully represent the wealth of information in the raw data. As another example, the machine learning model may feature advantages in frequency by enabling real-time or near real-time data and risk updates because risk scores are generated as new data is received, in contrast to other systems in which data and alerts may be updated infrequently (e.g., on a monthly basis). As another example, the machine learning model may feature advantages in history by enabling all data to be available at any time, thereby allowing analysts and algorithms to use any or all history for a client as inputs to assess riskiness; in contrast to other systems which may offer access to only recent history (e.g., months instead of years of data are available to alert rules and analysts).

Figure 14D:
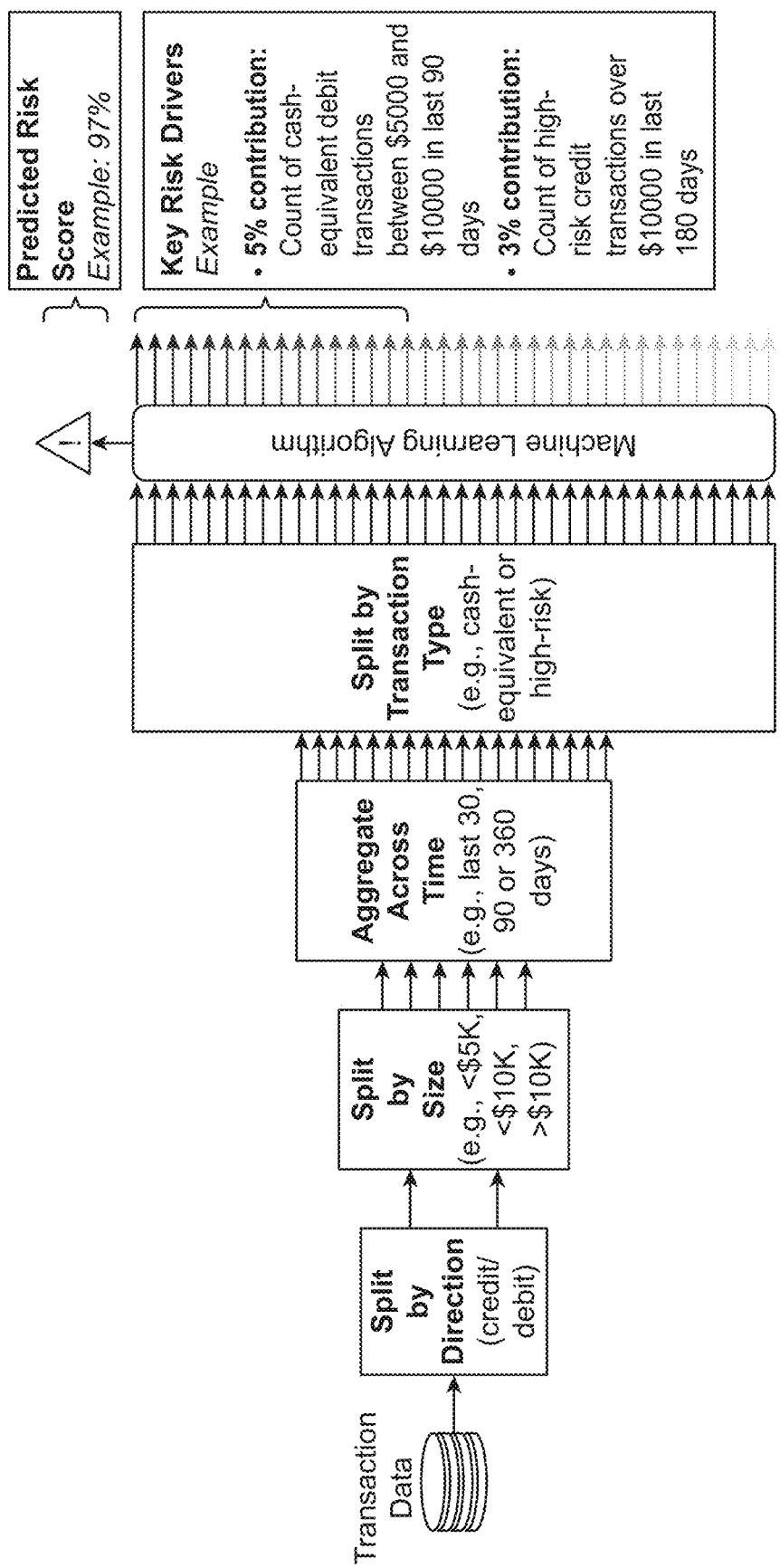
FIG. 14D shows an example of how the machine learning model may be designed to perform exhaustive feature engineering.

The machine learning model may be designed to perform exhaustive feature engineering (as shown in FIG. 14D), using one or more of the following methods to structure raw data, thereby creating hundreds or thousands of features (e.g., signals) for the algorithm: parametric manipulations (e.g., across time, volume, and transaction types), anomaly detection (relative to historical behaviors and expected peer group behaviors), segmentation (using supervised and/or unsupervised learning techniques), graph analytics (detecting networks of illicit accounts), or natural language processing (NLP) (to mine SWIFT wire messages and other raw-text data). Data aggregation can be applied to any feature. For example, the transaction data may be aggregated across time (e.g., about 1, 2, 3, 4, 5, 6, or 7 days, about 1, 2, 3, 4, 5, 6, 7, 8, 9, 10, 11, or 12 months, or about 1, 2, 3, 4, 5, or more years). The machine learning algorithm may generate a predicted risk score (e.g., 97%) corresponding to a particular account or account holder. In some embodiments, the output of the machine learning model may further include key risk drivers, such as a 5% contribution for "count of cash-equivalent debit transactions between $5K and $10K in the last 90 days" and a 3% contribution for "count of high-risk credit transactions over $10K in the last 180 days".

The machine learning model may use a set of machine learning features designed to extract a comprehensive set of signals from the raw data. The models can then be trained to use these signals to detect money laundering of all risk typologies (as shown in FIG. 14E). The feature set may be broken down by feature class, such as party attributes (e.g., attributes or characteristics of the client including both internal and externally available data), party behaviors (e.g., behavior of parties as demonstrated through transactions, wires, or other actions that leave a digital trace), anomalies (e.g., abnormal transaction patterns relative to stated business; abnormal patterns relative to historical benchmark; abnormal patterns relative to stated income), associations (e.g., proximity to known money launderers; similar transaction patterns to known money launderers; associations with high-risk businesses or countries), and segmentation (e.g., segmentation based on country, transaction behavior, business sector, legal entity type, shared accounts, high-frequency relationships).

The machine learning model may use a set of machine learning features designed to provide robust coverage of all types of digital information that might be used to identify suspicious activity (as shown in FIGS. 14F-14H).

The feature set may be broken down by feature class, including a set of "red flags" features (FIG. 14F), such as suspicious information (e.g., customer provides suspicious or incomplete information), recordkeeping avoidance (e.g., customer behavior is designed to avoid reporting thresholds or requirements), funds transfers (e.g., customer conducts suspicious transactions), inconsistent behavior (e.g., customer behavior relative to expected behavior), cross-border transactions (e.g., customer has ties to or conducts transactions with high-risk geographies), shell company activity (e.g., customer or account operates on behalf of an unknown beneficiary), and other features (e.g., other red flags including suspicious lending, insurance, or other activity).

The feature set may be broken down by feature class, including a set of "money laundering steps" features (FIG. 14G), such as placement (e.g., introduction of illicit funds into formal financial services), layering (e.g., movement of funds to obfuscate trail to the origin of the funds), and integration (e.g., transactions to create an appearance of legality for sources of funds).

The feature set may be broken down by feature class, including a set of "AML business functions" features (FIG. 14H), such as transaction monitoring (e.g., suspicious activity or transaction monitoring systems), know your customer (e.g., know your customer or client due diligence systems, and watch list (watch list filtering for politically exposed or other relevant persons).

The machine learning model may provide interpretability for an analysis result. The machine learning model may provide interpretability for surveillance and investigation analysts (as shown in FIG. 14I). In some cases, one or more contributing factors associated with a likelihood score may be identified and the respective contribution factor may be generated by the machine learning model. In some cases, the output result of the machine learning model may include a feature contribution factor and a feature importance value for each likelihood score. In some cases, the output result of the machine learning model may include a plurality of features grouped by typologies. For example, by viewing contribution values of different features categorized into different potential typologies (e.g., lack of transparency, cross-border transactions, structuring, flow through of funds, unusual fund transfer, high-risk associations, activity inconsistency, and tax evasion) and different categories of feature contributions (e.g., account holder characteristics and changes, balances, structuring activity, flow through of funds, direct geographic risk and associated risk, natural language processing, transaction activity changes, and related party characteristics), analysts can understand the relative contributions and importance of the different categories of potential typologies and features toward generating the machine learning risk score using the machine learning model. For example, a higher value of a feature comprising a count of foreign accounts of an account holder in conjunction with the other features values may have a relatively higher contribution toward the machine learning model's predictions, while a feature comprising a count of all transactions with counterparty in different financial institutions in the last 2 days may have a relatively small contribution toward the machine learning model's predictions of identifying suspicious cases. Using such metrics for different features and typology categories, surveillance and investigation analysts may model interpretability and case reviews. Additionally, the machine learning model may use human-understandable features (transaction groups, account attributes, time ranges of interest, etc.) to facilitate interpretability evaluations by users such as surveillance and investigation analysts.

The machine learning model may apply natural language processing (NLP) to transactions to derive important information, such as identifying similarities in accounts, account holders, and account information, as shown in FIG. 15. Such NLP approaches may be beneficial since many fraudulent activities may occur under the guise of fake or falsified account information aimed to avoid detection from legitimate account dealings. The AML model may review all account or account holder information (business type, company transactions, account holder names, addresses) and determine a similarity score for different accounts or account holders. The similarity score may be crucial in identifying criminal activity that has moved accounts or shares characteristics that would support separation of legitimate and criminal activity. The natural language processing applied to transaction messages may include text pre-processing (e.g., configuring a pre-processing pipeline, and processing and persisting text data), training a corpus language model for a count of n-grams, using a machine learning model to retrieve a time-series of count and to find important n-grams to predict a label, implementing metrics for important n-grams, and incorporating NLP metrics along with other features in a general classifier.

The AML model may use graph technology to take advantage of existing, extensive and emergent connections between attributes of interest, such as similarities in accounts, transfers among entities, and degrees of separation. These attributes of interest may be particularly useful as inputs to the machine learning classifier when determining the likelihood of illegal activity for any individual account or account holder. A variety of graph methods may be applied, such as: trusted PageRank, traversal, and clustering.

For example, the trusted PageRank method may take the premise that a "trusted" set of nodes can support validation or ranking of other unknown nodes. In search engines, trusted nodes may include government and education websites. Analysis and evaluation of the links from those sites may enable classification of nodes that are some number of hops from the trusted nodes. Alternatively, "untrusted" nodes can be used in the same manner, with the degree of closeness defining a highly risky node. These methods may be useful but may require augmentation to ensure that those nodes which are "gaming the system" are detected and rooted out. Coupled with the trusted and untrusted nodes, random walks among nodes may be evaluated as hubs. In websites, links may be traversed with a given probability of teleportation. The random walkers may eventually hit trusted and untrusted nodes. This approach may enable analysis of the broad system, taking advantage of trusted nodes, but also avoiding problems of hackers who make their way into becoming a trusted node. In application to anti-money laundering, trusted PageRank can be applied in a similar manner, in which known "non-illicit" accounts are trusted and the known illicit accounts are untrusted. The graph can be traversed through transactions among accounts, connections among accounts, and similarities between accounts. Additionally, the links between accounts can be bi-directional and have a quantity (e.g., in the context of values of transactions).

$$PR(acct) = \sum_{v \in B_{acct}} \frac{PR(v)}{L(v)}$$

The PageRank value for a node acct may be dependent on the PageRank values for each page v contained in the set $B_{acct}$ (the set containing all pages linking to node acct), divided by the number $L(v)$ of links from node v.

Figure 16:
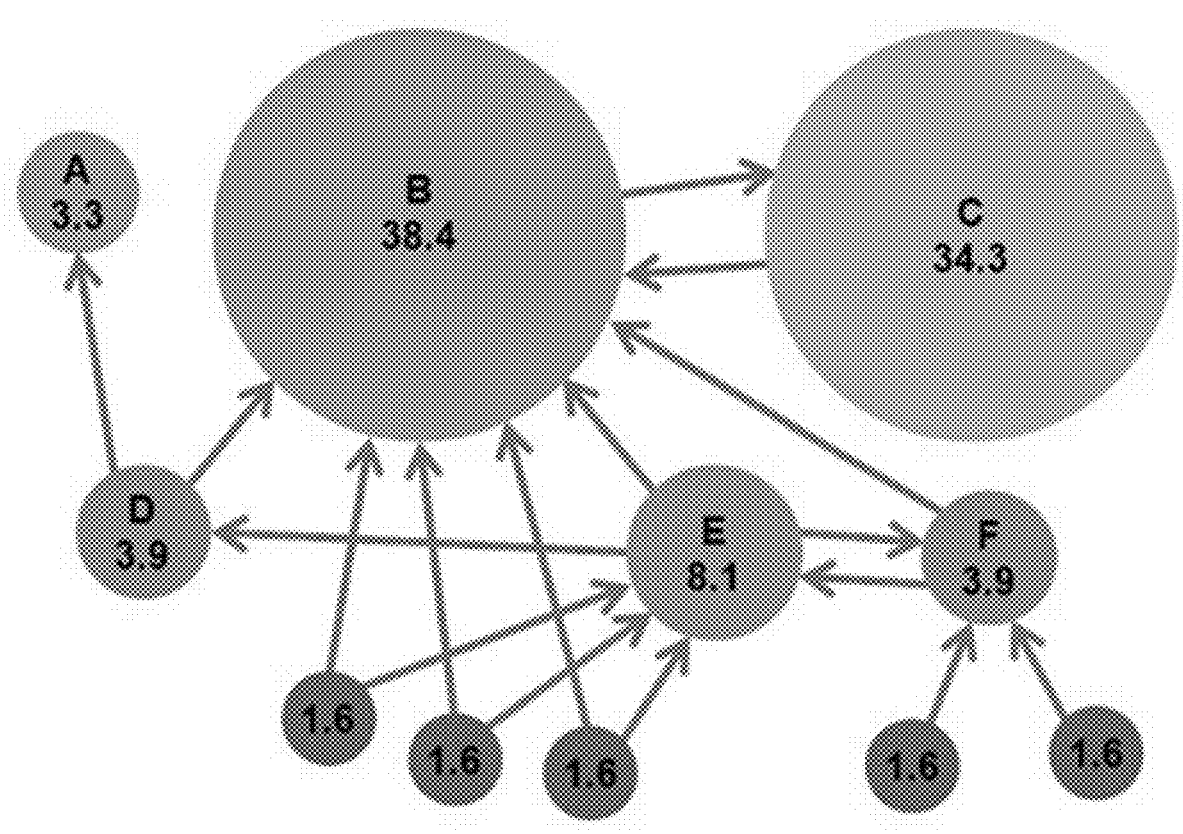
FIG. 16 shows an example of how the AML model may use the trusted PageRank method.

As shown by the example in FIG. 16, a higher rank is given to C than E, despite E having more connections. However, C has a bidirectional link with B (a trusted node), which gives it greater relevance. E's network is much weaker, as none of its connected nodes have clear trusted links with B.

As another example, the traversal method may utilize two methods to characterize nodes: depth and breadth. Depth traversals may analyze the sub-nodes similar to those of branches and leaves on a tree. Only in the case of banking transactions, circular references may be likely seen as the ending depth for a particular path. With depth traversals, the number of connected nodes and specific degree of closeness for an account can be analyzed with respect to those of labeled fraud accounts.

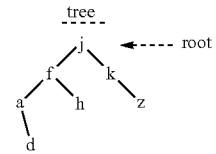

Breadth traversals may examine each level of separation from a target node completely before moving to the next level. This approach may enable analysis of all connected nodes with a specific degree of closeness to a target node.

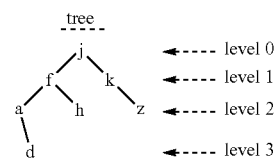

The traversal outputs may become features for the machine learning models developed to characterize illegal activity.

Figure 17:
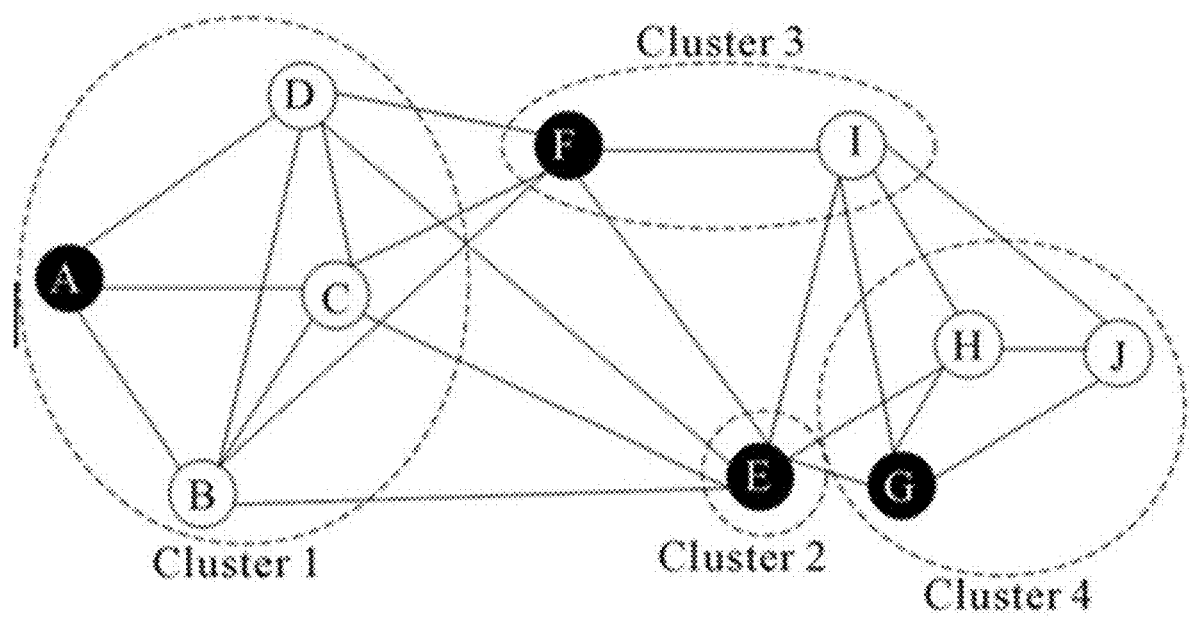
FIG. 17 shows an example of how the AML model may use traditional clustering techniques to identify similarities among accounts that may be indicative of fraudulent activity.

As another example, traditional clustering techniques can be applied to anti-money laundering to identify similarities among accounts that may be indicative of fraudulent activity, as shown in FIG. 17. The clustering parameters can include account attributes, account transaction activity, or entities with which the accounts have engaged. Clustering may provide context for relationships among entities in the overall sphere of visibility for a bank. These clusters may become useful for the machine learning classifier as features to support identification of more likely fraudulent clusters, in addition to identifying emergent clusters as they form (e.g., criminals beginning to use different methods as old ones become stale or risky).

The AML model may support identification of a multitude of illegal activity from money laundering to terrorism financing. In addition to the machine learning model trained on historical cases of illegal activity, the AML platform may also provide a suite of advanced analytics that support machine learning interpretability and codify existing rules and business processes to near real-time streaming information. The analytics may be described using various classes based on the predominant mode of issue (e.g., placement, layering, foreign exchange, structuring, suspicious actions, transaction, and account), as summarized in FIG. 18.

Each analytic can either take a complex algorithm and apply it to a source of data, like transactions, or can combine information from multiple systems to provide contextualized and nuanced output. In addition, the analytics can be run on each account and updated with every new relevant data attribute that is loaded into the AML platform, such that the AML platform is a single source for correlating data across systems and applying complex logic to each account, supporting AML efforts.

Placement analytics may be designed to identify new accounts or large transactions that indicate the start of money laundering activities, such as a large transaction associated with a new or modified account, or a suspicious account holder. Such analytics may include new transactions, suspicious account changes, suspicious identifications, and large transactions after an account change. "New Transaction" may describe an event for each unique type of transaction on an account. "Suspicious Account Change" may describe an account change with close connections to sanctioned entities or criminal/terrorist activities. "Suspicious identification" may use NLP to flag suspicious or duplicate account holders. "Large transaction after account change" may flag accounts or account holders for suspicious activity when a new account holder or address is changed and a large transaction occurs within a given duration of time (e.g., 30 days).

The AML model may comprise layering analytics designed to detect account transactions that indicate the subsequent covering up of placement transactions and that are meant to diffuse money laundering activities. Such layering analytics may include unique types of transactions, variance in transactions, and sustained transactions. For example, unique types of transactions may include a set of transactions that occur within a short period of time (e.g., about 1, 2, 3, 4, 5, 6, or 7 days, about 1, 2, 3, 4, 5, 6, 7, 8, 9, 10, 11, or 12 months). Layering may indicate that criminals are attempting to move money around and may include transactions such as placing securities orders, taking out insurance policies and moving money across different countries. Variance in transactions may include anomalous transactions relative to similar businesses or account holders. Sustained transactions may include transactions that meet the size of a potential placement transaction.

The AML model may comprise foreign exchange analytics designed to identify transactions involving moving currencies and countries and to flag the suspicious transactions. Such foreign exchange analytics may include transactions with known terrorist connections, transactions without FOREX discrimination, SWIFT-identified suspicious transactions, and inconsistent currency exchange transactions. "Known terrorist connection" analytics may use existing terrorist databases and graph technology to link recipients of foreign exchange with degrees of closeness. "Transactions without FOREX discrimination" may describe tracking the variation in FOREX rates between currencies and correlating them among the transactions occurring. Since normal account holders may either send money across currencies regularly (as in remittance) or very rarely, such analytics may lead to investigation of those waiting to move money when rates turn favorable for a short time. "SWIFT-identified suspicious transactions" may describe transactions identified as suspicious using SWIFT. "Inconsistent currency exchange" analytics may track accounts that are moving money to different currencies without explanation.

The AML model may comprise structuring analytics designed to target the types of transactions that are meant to be under the radar of most financial reporting regulations. Such structural analytics may include identifying transactions at multiple locations or below certain limits. For example, structuring analytics may identify the structuring of transactions at multiple locations to avoid federal reporting limits, by using the number of unique transaction locations correlated with the consistency of dollar figures deposited or withdrawn. As another example, structuring analytics may identify a number of transactions below limits required to show identification, by flagging accounts with a high number of transactions below reporting limits, but within a certain threshold of those limits. Structuring analytics may identify a number of transactions below identification limits, by tracking the number of transactions that are occurring below requirements to verify identification and correlating the results across multiple locations to identify outliers.

The AML model may comprise suspicious actors analytics designed to target and flag transactions with recipients or senders that have known connections to sanctioned entities or criminal or terrorist databases. Such suspicious actors analytics may include transactions with suspicious entities, depositors with criminal backgrounds, transactions inconsistent with stated occupations, and high transactions. "Transactions with suspicious entities" may describe using graph technology to establish a degree of closeness with suspicious entities such as terrorist regimes, criminal connections. "Depositors with criminal backgrounds" may describe flagging depositors not among the primary account holder that are making transactions but also have criminal background or connection. "Transactions inconsistent with stated occupations" may describe comparing transaction sizes among occupations and flag accounts that are clear outliers. "High transactions" may describe flagging transactions at rates that are above normal for the account type across a range of attributes.

The AML model may comprise transaction analytics, which may be useful toward identifying money launderers and terrorist financiers. The placement, layering, and integration of such activities require a series of precise and consistent transactions that can be found using advanced analytics and machine learning. For example, transaction analytics may comprise reviewing cash ratios (e.g., a ratio of cash transactions to all transactions over a given period of time) by transaction and in aggregate, since cash ratio can provide contextualized information about the account. As another example, transaction analytics may comprise identifying multiple deposits of similar size, by tracking the number of very consistent deposits that do not fall within normal payment periods. As another example, transaction analytics may comprise tracking transactions spatially and temporally, by creating multi-dimensional models of all transactions to identify outliers with respect to the number of transactions and the unique locations (e.g., a number of transactions per unique location over a given period of time). As another example, transaction analytics may comprise flagging various and consistent usage of non-conventional monetary instruments, by reviewing use of monetary instruments like securities and life insurance with track over time. As another example, transaction analytics may comprise identifying unusual withdrawals, since large or consistent withdrawals may indicate illicit movement of funds.

The AML model may comprise account analytics designed to review the attributes and connections of accounts and account holders to help correlate criminal or suspicious activity based on historical cases. Such account analytics may include a high number of account holders at same address, a blacklist, unusual business, gaps in account data, and removed account information. "High number of account holders at same address" may describe outliers in the number of account holders (primary and secondary) with the same address. "Blacklist" may describe correlating account holders and connected financial institutions with sanctioned entities or criminal and terrorist databases. "Unusual business" may describe reviewing the use of a business account and flagging suspicious activity. "Gaps in account data" may describe reviewing accounts and identifying non-essential information that is not present and unusual to be not present for the given type of account. "Removed account information" may describe providing contextualized information by correlating accounts in which certain transactions or information has been removed.

Computer Systems

Figure 19:
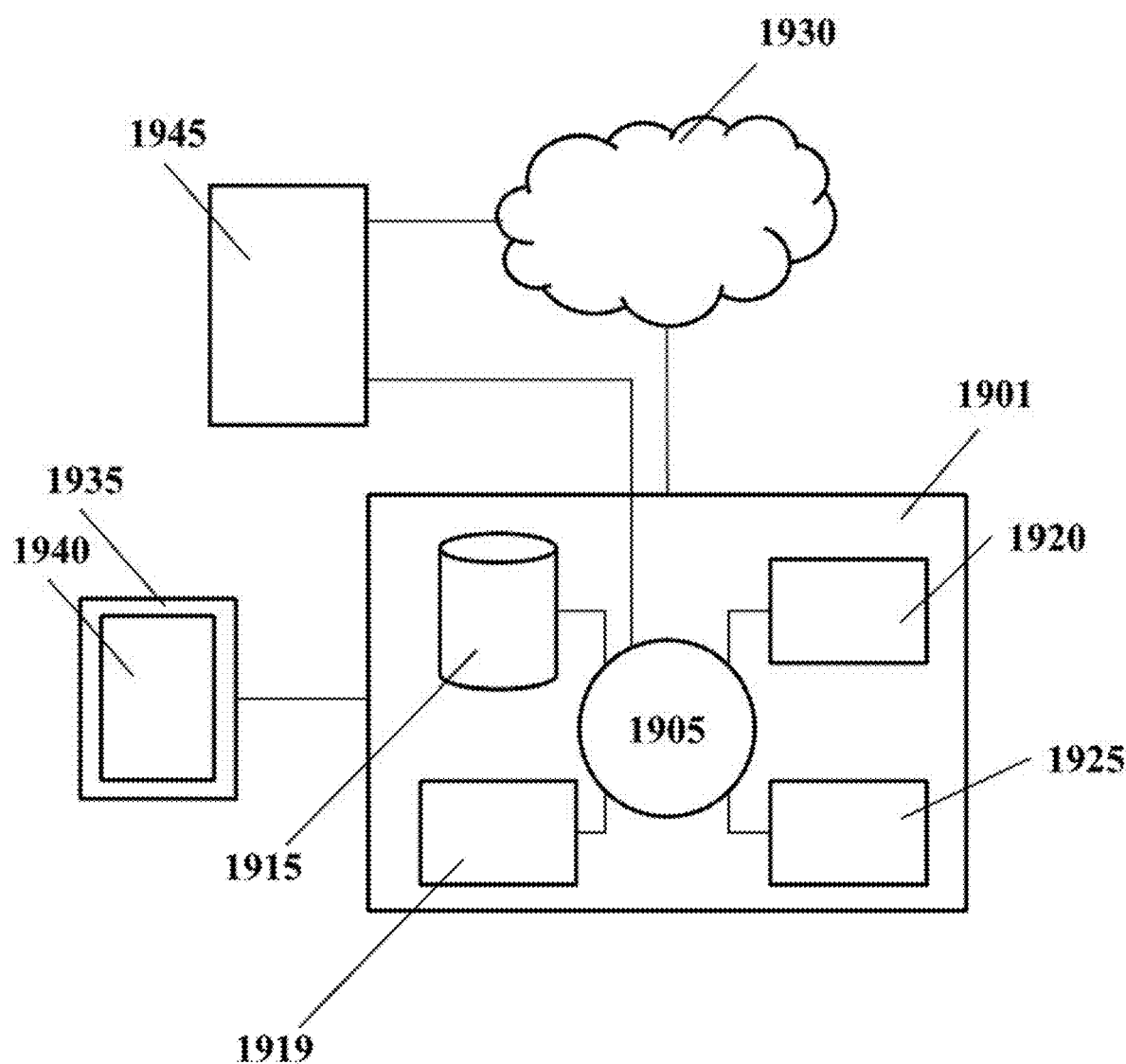
FIG. 19 shows a computer system that is programmed or otherwise configured to implement methods provided herein.

The present disclosure provides computer systems that are programmed to implement methods of the disclosure. FIG. 19 shows a computer system 1901 that is programmed or otherwise configured to implement methods provided herein.

The computer system 1901 can regulate various aspects of the present disclosure, such as, for example, (a) obtaining a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; (b) applying a trained algorithm to the dataset to generate a money laundering risk score for each of the plurality of account holders and one or more key risk drivers associated with the money laundering risk score; and (c) identifying a subset of the plurality of account holders for investigation based at least on the money laundering risk scores of the plurality of account holders. The computer system 1901 can be an electronic device of a user or a computer system that is remotely located with respect to the electronic device. The electronic device can be a mobile electronic device.

The computer system 1901 includes a central processing unit (CPU, also "processor" and "computer processor" herein) 1905, which can be a single core or multi core processor, or a plurality of processors for parallel processing. The computer system 1901 also includes memory or memory location 1910 (e.g., random-access memory, read-only memory, flash memory), electronic storage unit 1915 (e.g., hard disk), communication interface 1920 (e.g., network adapter) for communicating with one or more other systems, and peripheral devices 1925, such as cache, other memory, data storage and/or electronic display adapters. The memory 1910, storage unit 1915, interface 1920 and peripheral devices 1925 are in communication with the CPU 1905 through a communication bus (solid lines), such as a motherboard. The storage unit 1915 can be a data storage unit (or data repository) for storing data. The computer system 1901 can be operatively coupled to a computer network ("network") 1930 with the aid of the communication interface 1920. The network 1930 can be the Internet, an internet and/or extranet, or an intranet and/or extranet that is in communication with the Internet.

The network 1930 in some cases is a telecommunication and/or data network. The network 1930 can include one or more computer servers, which can enable distributed computing, such as cloud computing. For example, one or more computer servers may enable cloud computing over the network 1930 ("the cloud") to perform various aspects of analysis, calculation, and generation of the present disclosure, such as, for example, (a) obtaining a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; (b) applying a trained algorithm to the dataset to generate a money laundering risk score for each of the plurality of account holders; and (c) identifying a subset of the plurality of account holders for investigation based at least on the money laundering risk scores of the plurality of account holders. Such cloud computing may be provided by cloud computing platforms such as, for example, Amazon Web Services (AWS), Microsoft Azure, Google Cloud Platform, IBM cloud, and a private cloud. The network 1930, in some cases with the aid of the computer system 1901, can implement a peer-to-peer network, which may enable devices coupled to the computer system 1901 to behave as a client or a server.

The CPU 1905 can execute a sequence of machine-readable instructions, which can be embodied in a program or software. The instructions may be stored in a memory location, such as the memory 1910. The instructions can be directed to the CPU 1905, which can subsequently program or otherwise configure the CPU 1905 to implement methods of the present disclosure. Examples of operations performed by the CPU 1905 can include fetch, decode, execute, and writeback.

The CPU 1905 can be part of a circuit, such as an integrated circuit. One or more other components of the system 1901 can be included in the circuit. In some cases, the circuit is an application specific integrated circuit (ASIC).

The storage unit 1915 can store files, such as drivers, libraries and saved programs. The storage unit 1915 can store user data, e.g., user preferences and user programs. The computer system 1901 in some cases can include one or more additional data storage units that are external to the computer system 1901, such as located on a remote server that is in communication with the computer system 1901 through an intranet or the Internet.

The computer system 1901 can communicate with one or more remote computer systems through the network 1930. For instance, the computer system 1901 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1901 via the network 1930.

Methods as described herein can be implemented by way of machine (e.g., computer processor) executable code stored on an electronic storage location of the computer system 1901, such as, for example, on the memory 1910 or electronic storage unit 1915. The machine executable or machine-readable code can be provided in the form of software. During use, the code can be executed by the processor 1905. In some cases, the code can be retrieved from the storage unit 1915 and stored on the memory 1910 for ready access by the processor 1905. In some situations, the electronic storage unit 1915 can be precluded, and machine-executable instructions are stored on memory 1910.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 1901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1901 can include or be in communication with an electronic display 1935 that comprises a user interface (UI) 1940. Examples of user interfaces (UIs) include, without limitation, a graphical user interface (GUI) and web-based user interface. For example, the computer system can include a web-based dashboard (e.g., a GUI) configured to display, for example, a BOM to a user.

Methods and systems of the present disclosure can be implemented by way of one or more algorithms. An algorithm can be implemented by way of software upon execution by the central processing unit 1905. The algorithm can, for example, (a) obtain a dataset comprising a plurality of accounts, each of the plurality of accounts corresponding to an account holder among a plurality of account holders, wherein each account of the plurality of accounts comprises a plurality of account variables, wherein the plurality of account variables comprises financial transactions; (b) apply a trained algorithm to the dataset to generate a money laundering risk score for each of the plurality of account holders; and (c) identify a subset of the plurality of account holders for investigation based at least on the money laundering risk scores of the plurality of account holders.

The present disclosure is not limited to the algorithms disclosed herein. It should be appreciated that other algorithms compatible for use with the described embodiments may be contemplated.

Although the description has been described with respect to particular embodiments thereof, these particular embodiments are merely illustrative, and not restrictive. Concepts illustrated in the examples may be applied to other examples and implementations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for anti-money laundering (AML) analysis, comprising:
   (a) obtaining, by a computer, a dataset comprising a plurality of accounts, each of the plurality of accounts corresponding to an account holder among a plurality of account holders, wherein each account of the plurality of accounts is defined by a plurality of account variables, wherein the plurality of account variables comprises variables about financial transactions associated with the account;
   (b) extracting, by the computer, a set of features from the dataset, wherein the set of features are associated with at least one of the plurality of account holders and at least one of the plurality of account variables;
   (c) applying, by the computer, a trained machine learning algorithm to the set of features to determine (i) a money laundering risk score for each of the plurality of account holders and (ii) a feature importance value for each of the set of features associated with the determined money laundering risk score;
   (d) ranking, by the computer, at least a subset of the plurality of account holders for investigation for money laundering, based at least in part on money laundering risk scores of account holders of the subset; and
   (e) displaying, by the computer via a graphical user interface, (i) at least the subset of the plurality of account holders ranked in (d) and (ii) for each of the subset of the plurality of account holders, at least a subset of the set of features that contribute most to the money laundering risk score of the account holder.

2. The method of claim 1, wherein obtaining the dataset comprises aggregating datasets from a plurality of disparate sources selected from the group consisting of: online and retail transactions, account and account holder characteristics in a pre-selected time window, trading surveillance platforms, PEP lists, sanction and regulatory catalogs, terror and criminal watch lists, currency exchange history, and cross-border transaction information.

3. The method of claim 2, further comprising generating at least a subset of the plurality of account variables based at least in part on the aggregated datasets.

4. The method of claim 1, wherein the trained machine learning algorithm is selected from the group consisting of: a support vector machine (SVM), a naïve Bayes classification, a linear regression, a quantile regression, a logistic regression, a random forest, a neural network, and a gradient-boosted classifier or regressor.

5. The method of claim 1, wherein each of the plurality of money laundering risk scores is indicative of a probability that the account holder corresponding to the money laundering risk score has one or more accounts comprising one or more financial transactions corresponding to money laundering activity.

6. The method of claim 1, further comprising generating a weighted priority score for each of the plurality of account holders based at least in part on the money laundering risk score of the account holder and a quantitative measure of the account holder or of a transaction of the account holder.

7. The method of claim 6, wherein the quantitative measure is selected from the group consisting of: a quantity of at-risk assets, a quantity of total assets, a net worth, a number or a total value of suspicious transactions, a length of time of a suspicious transaction or activity, and a quantitative measure related to the account holder's relationship to a set of accounts.

8. The method of claim 6, further comprising sorting the plurality of account holders based at least in part on the weighted priority scores for each of the plurality of account holders.

9. The method of claim 6, further comprising ranking an account holder of the subset of the plurality of account holders for investigation for money laundering when the weighted priority score of the account holder of the subset meets a pre-determined criterion.

10. The method of claim 9, wherein the pre-determined criterion is a dollar amount of a suspicious transaction on the account of the account holder being at least about 10 thousand dollars, at least about 25 thousand dollars, at least about 50 thousand dollars, at least about 75 thousand dollars, at least about 100 thousand dollars, at least about 250 thousand dollars, at least about 500 thousand dollars, at least about 750 thousand dollars, or at least about 1 million dollars.

11. The method of claim 9, wherein the pre-determined criterion is a number of suspicious transactions associated with the account of the account holder being at least about all 2, 3, 4, 5, 6, 7, 8, 9, 10, 15, 20, or more than 20.

12. The method of claim 6, further comprising generating an alert when a weighted priority score for one or more of a set of watch list account holders satisfies a pre-determined threshold.

13. The method of claim 1, further comprising generating, by the computer, a recommended decision based at least in part on the identified subset of the plurality of account holders.

14. The method of claim 1, further comprising generating an alert when a money laundering risk score for one or more account holders among a plurality of watch list account holders satisfies a pre-determined threshold.

15. The method of claim 1, further comprising processing the identified subset of the plurality of account holders to generate an analytics chart, wherein the analytics chart comprises a visualization and analytic information of each of the ranked subset of the plurality of account holders; and displaying the analytics chart to a user.

16. The method of claim 15, wherein the visualization comprises a geospatial visualization.

17. The method of claim 1, wherein the trained machine learning algorithm comprises a natural language processing algorithm comprising an n-gram model, wherein the natural language processing algorithm is configured to determine a similarity score between two or more accounts of the plurality of accounts based at least in part on text-based information associated with the two or more accounts.

18. The method of claim 1, wherein the plurality of account variables comprises one or more of a cash ratio, a layering risk, a structuring risk, a credit risk, a total balance, an address change, a transaction frequency, and a transaction spacing.

19. The method of claim 1, wherein the trained algorithm detects transactions indicative of layering.

20. The method of claim 1, wherein the trained algorithm detects one or more of (i) transactions associated with sanctioned entities or known criminal or terrorist organizations, (ii) transactions without FOREX discrimination, (iii) SWIFT-identified suspicious transactions, (iv) inconsistent currency exchange transactions, and (v) structured transactions.

21. The method of claim 1, wherein the trained algorithm determines cash ratios, detects multiple deposits of similar size, or detects usage of non-conventional monetary instruments.

22. The method of claim 1, wherein the trained algorithm analyzes connections of accounts and account holders to correlate criminal or suspicious activity based on historical cases.

23. The method of claim 1, wherein (f) comprises displaying at least the subset of the plurality of account holders via a graphical user interface in descending order of money laundering risk scores.

24. The method of claim 1, wherein the variables about financial transactions comprise at least a transaction type, a transaction amount, and an aggregate transaction amount over time.

25. The method of claim 1, wherein the set of features comprises at least one of: party attributes, party behaviors, anomalies, associations, and segmentation.

26. The method of claim 1, wherein the feature importance values are indicative of relative contributions of each of the set of features used by the trained machine learning algorithm to determine the money laundering risk scores for the plurality of account holders.

27. The method of claim 1, wherein (f) further comprises displaying, for each of the subset of the plurality of account holders, feature importance values of the subset of the set of features that contribute most to the money laundering risk score of the account holder.

28. The method of claim 1, wherein (f) further comprises displaying, for each of the subset of the plurality of account holders, the subset of the set of features that contribute most to the money laundering risk score of the account holder grouped by risk typologies.

29. The method of claim 1, wherein the method further comprises, prior to (c), identifying, by the computer, at least the subset of the set of features that contribute most to the money laundering risk score based at least in part on feature importance values for the set of features, and that satisfy an objective function for training and optimizing performance of the trained machine learning algorithm.

* * * * *